United States Patent
Chopra et al.

(10) Patent No.: US 10,042,711 B1
(45) Date of Patent: Aug. 7, 2018

(54) DISTRIBUTED DATA PROTECTION TECHNIQUES WITH CLONING

(71) Applicant: EMC IP Holding Company LLC, Hopkinton, MA (US)

(72) Inventors: Shelesh Chopra, Bangalore (IN); Vladimir Mandic, San Jose, CA (US); Kiran M V Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 235 days.

(21) Appl. No.: 14/974,231

(22) Filed: Dec. 18, 2015

(51) Int. Cl.
*G06F 7/00* (2006.01)
*G06F 17/00* (2006.01)
*G06F 11/14* (2006.01)

(52) U.S. Cl.
CPC ...... *G06F 11/1451* (2013.01); *G06F 11/1456* (2013.01); *G06F 11/1464* (2013.01); *G06F 2201/84* (2013.01)

(58) Field of Classification Search
CPC ............ G06F 11/1451; G06F 11/1456; G06F 11/1464; G06F 11/1662; G06F 17/30575; G06F 11/2094; G06F 2201/84
See application file for complete search history.

(56) References Cited

U.S. PATENT DOCUMENTS

| | | | |
|---|---|---|---|
| 2007/0258388 A1* | 11/2007 | Bose | H04L 67/1002 370/254 |
| 2010/0082551 A1* | 4/2010 | Kathuria | G06F 17/30433 707/674 |
| 2013/0054531 A1* | 2/2013 | Susairaj | G06F 17/30306 707/640 |
| 2014/0095816 A1* | 4/2014 | Hsu | G06F 3/0655 711/162 |
| 2017/0024260 A1* | 1/2017 | Chandrasekaran | G06F 9/45558 |

* cited by examiner

*Primary Examiner* — Azam Cheema
(74) *Attorney, Agent, or Firm* — Staniford Tomita LLP

(57) ABSTRACT

A request is received to clone a primary backup copy. An identification is made of a disk image file including the primary backup copy. The disk image file is scanned to split an amount of data to be cloned among a set of hosts. The hosts are provisioned. The hosts are assigned a portion of the amount of data to be cloned. A host clones its respective portion in parallel with another host to create clone sets on a clone target. A clone set includes a copy of at most a portion of the primary backup copy.

16 Claims, 20 Drawing Sheets

905 ⟶

```
Receive at the clone target copies of portions of the primary
backup copy as clone sets, each clone set having a sequence
number indicating its respective order for a clone of the primary
backup copy
910
```

↓

```
Assemble the clone sets according to the sequence number to
create the clone
915
```

↓

```
Generate an entry in the backup media database indicating that a
clone of the primary backup copy has been created
920
```

In response to a sparse disk file, create a new native disk file having a size equal to a disk size specified within the sparse disk file
1601

Parse the sparse disk file to identify a block allocation table (BAT) within the sparse disk file
1602

For each entry of the BAT table, perform a fast copy/rebase on a corresponding payload block of the sparse disk file into the new native disk file
1603

FIG. 16

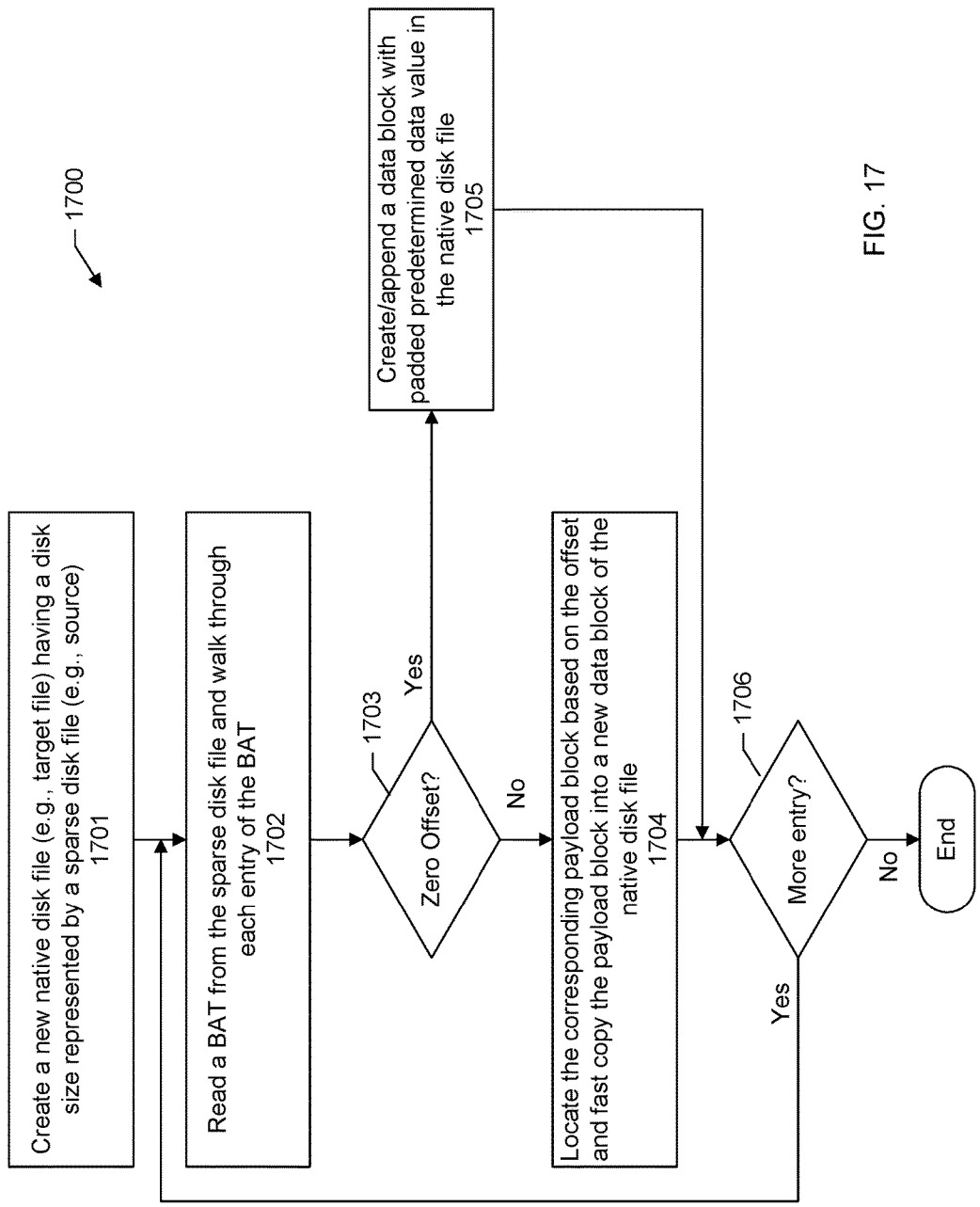

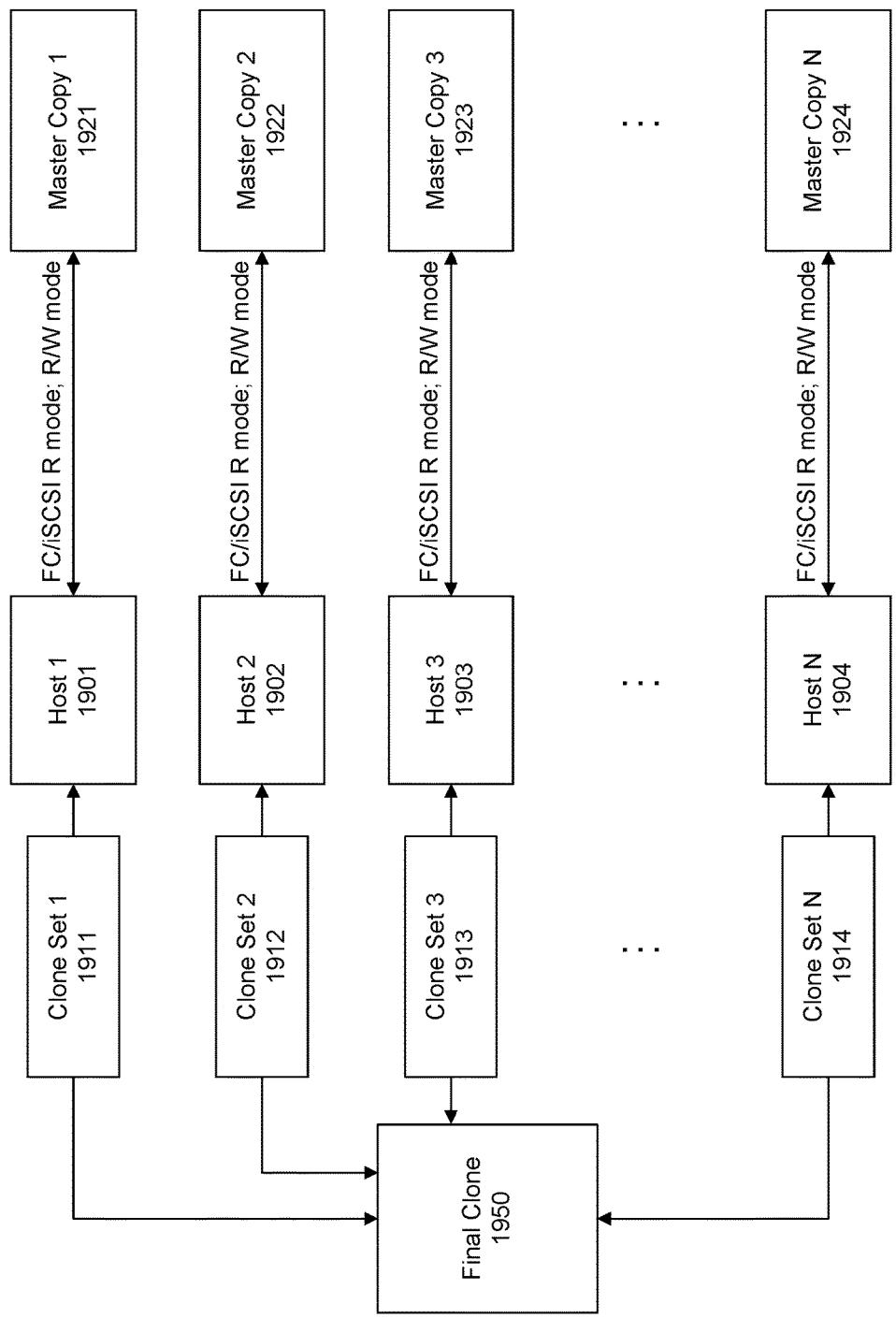

DISTRIBUTED DATA PROTECTION TECHNIQUES WITH CLONING

TECHNICAL FIELD

Embodiments are generally directed to networked-based data backup methods, and more specifically to reducing the time to clone data backups.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Companies and organizations are both generating and collecting more and more data at an ever increasing rate. This is due, in part, to the rise of enterprise applications, portable and mobile computing devices, wearable computers, social media, analytics, business intelligence, electronic health records, and e-commerce, among other growth areas.

Backing up files and other data helps to protect against accidental loss, data corruption, hardware failures, and natural disasters. The size of a typical backup for a company or organization can be many terabytes because of the vast amount of data available to be backed up. The data may include relational databases, mail, file systems, virtual systems, customer data, employee data, documents, video, and much more. We are in an age where backup data sets are growing increasingly large and complex. Take an example of Hyper-V, Exchange where a backup may include backing up not only large data sets but also managing the complexity of multiple nodes which may require backing up using multiple proxy nodes.

Despite having a backup copy it would be desirable to provide further redundancy in case the backup copy itself is compromised. Cloning is a process of creating multiple copies of the backup data. Another approach to create multiple or two backup copies is referred to as twinning in which two targets are written to at the time of the backup.

Both approaches have drawbacks. With twinning, the negative side-effect is that primary time-to-protect is slowed down to match time to write on either of the targets. In the case of one target being local to the system being protected and the second copy (clone) being remote, it is expected that the remote copy will take a longer time to write to and it is not desirable to slow down initial backup time to the time of the remote copy.

Cloning is a slow process as it is predominantly sequential. Techniques such as striping are not considered true block level cloning. Cloning can be a very time-consuming and computing resource intensive process because of the potentially large size of the primary backup and other complexities. These other complexities may include the formatting of the primary backup. For example, in some cases the primary backup copy may be stored as a virtual hard disk (VHD) or VHDx format. These formats are space efficient, but generally cannot be accessed using traditional techniques and thus present challenges.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 9 shows a flow of a process for assembling clone sets according to a specific embodiment.

FIG. 16 shows another flow diagram illustrating a process of providing instant access to data of a sparse disk file according to another specific embodiment.

FIG. 17 shows another flow diagram illustrating a process of providing instant access to data of a sparse disk file according to another specific embodiment.

FIG. 19B shows another block diagram illustrating a distributed system according to some embodiments.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

Disclosed herein are methods and systems for cloning within a distributed data protection platform. In a specific embodiment, parallel cloning techniques are applied to clone a primary backup. Multiple hosts are assigned different portions of the primary backup to clone. The hosts perform their respective cloning operations in parallel with other hosts which dramatically reduces the overall time required to make a complete copy of the primary backup (or other file). In another specific embodiment, the primary backup is stored in a first format. The first format can be a very space efficient format, but may be incompatible with traditional techniques of accessing data. A disk file conversion mechanism is provided that can instantly or very quickly convert the primary backup in the first format to a second format, different from the first format, where the second format is compatible with traditional techniques of accessing data. Once the primary backup is in the second format, the primary backup is exposed to the hosts and the hosts can begin the parallel cloning operations.

Figure 1:
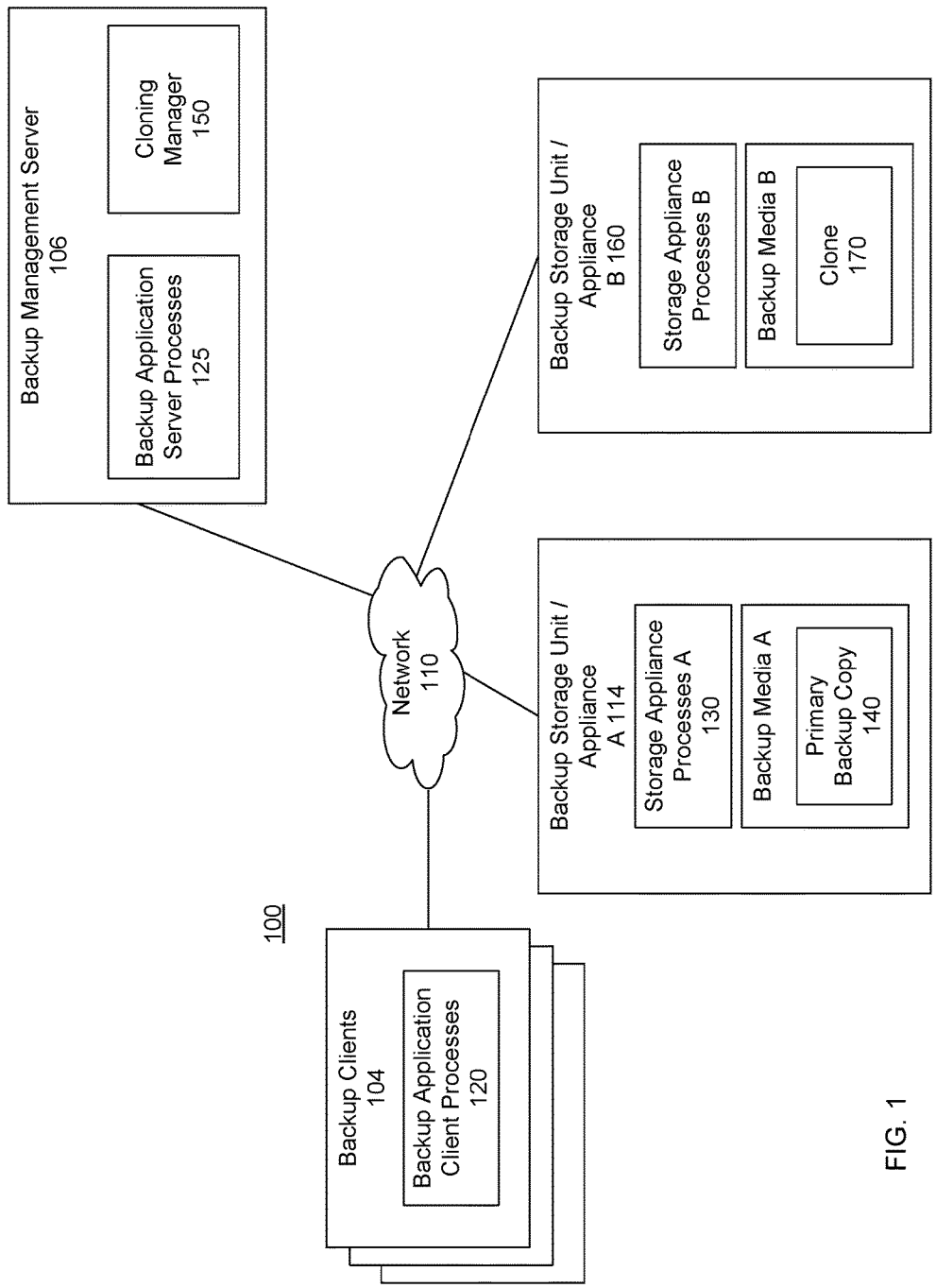
FIG. 1 is a diagram of a large-scale network implementing a data backup and recovery or restoration process that includes a cloning manager, under some embodiments.

FIG. 1 illustrates a computer network system 100 that implements one or more embodiments of a system for facilitating the parallel cloning, copying, or replication of a primary backup copy. In system 100, a number of clients 104 are provided to serve as backup clients or nodes. A network or backup server computer 106 is coupled directly or indirectly to these clients through network 110, which may be a cloud network, LAN, WAN or other appropriate network. Network 110 provides connectivity to the various systems, components, and resources of system 100.

The data generated within system 100 may be stored in a backup media of a storage system that may include a backup storage unit or appliance 114. The backup media may be located at any number of persistent storage locations and devices, such as local client storage, server storage, or network storage, which may at least be partially implemented through storage device arrays, such as RAID components.

For the embodiment of FIG. 1, network system 100 includes any number of backup clients 104, backup management server 106, and backup storage unit or appliance 114. Backups and recoveries or restorations are performed by a backup application. The backup application includes a client module or processes 120 executing at the backup clients, a server module or processes 125 executing at the backup server, and storage appliance processes 130 executing at the backup storage appliance server.

A backup client executes processes 120 for backing up data to the backup storage unit or appliance, restoring the backed up data, and coordinating with backup server processes 125 and processes 130 on the backup storage appliance. The backup server processes include processes to index the backups and identify which savesets reside on which backup devices or volumes of the backup storage system. The backup storage appliance server executes processes 130 for receiving backup information from the backup client, writing data to the backup devices or volumes, sending tracking information to the backup management server to track the data written to the devices or volumes, and reading the data from the devices or volumes at the request of the client, backup management server, or both during a recovery or restore. A backup of one or more clients may be stored as a primary backup copy 140 within the storage system at storage unit or appliance A 114.

In a specific embodiment, the backup management server includes a cloning manager 150. The cloning manager is responsible for cloning the primary backup copy onto a clone target or destination. The clone target can be another backup storage unit or appliance B 160 that may be within the storage system. Upon completion of the cloning operation, backup storage appliance B 160 will include a clone 170 of the primary backup copy. The clone can be used to recover or restore data to the one or more backup clients if the primary backup copy is damaged or otherwise unavailable. As discussed in further detail below, systems and methods are provided for multiple hosts that perform cloning operations in parallel to reduce the overall time required to create a clone of the primary backup copy.

Figure 11:
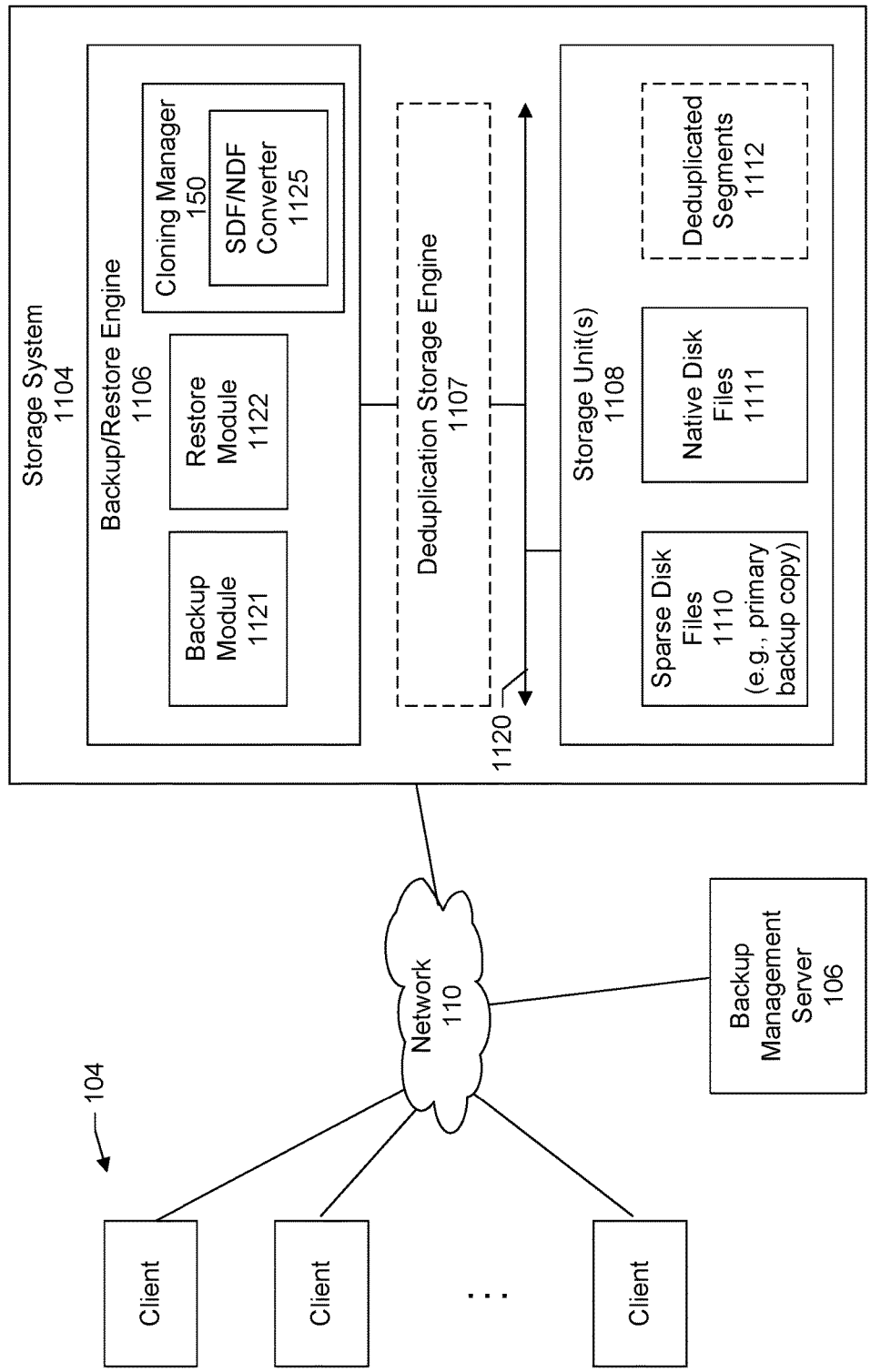
FIG. 11 shows a block diagram of a storage system storing a primary backup copy according to a specific embodiment.

Storage appliances A and B can be different storage units or appliances. Thus, if storage appliance A is compromised there will still be an opportunity to recover the backup because the backup has been cloned, copied, or replicated onto storage appliance B. Storage appliances A and B may be in different data centers or geographical areas. For example, storage appliance A may be located in Nevada. Storage appliance B may be located remotely from storage appliance A. For example, storage appliance B may be located at a data center in Kansas. Thus, if a natural disaster occurs in Nevada that damages storage appliance A there will still be an opportunity to recover the backup because the backup has been cloned onto storage appliance B located in Kansas. In a specific embodiment, the storage units or appliances form part of a storage system. Other components, modules, and processes of the storage system are shown in FIG. 11 and described in the discussion accompanying FIG. 11.

Figure 2:
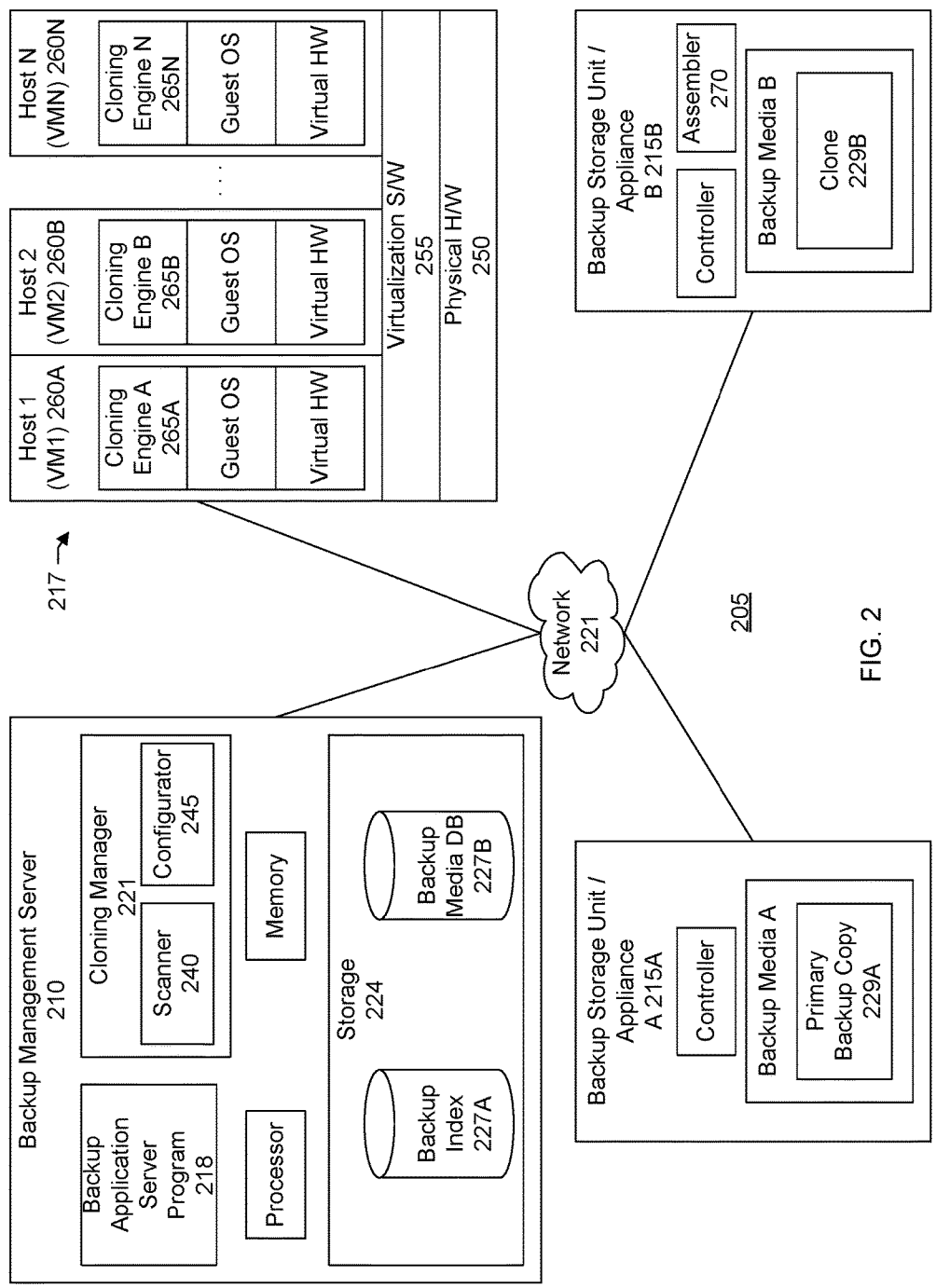
FIG. 2 shows a more detailed diagram of a system having a cloning manager and cloning engines to clone portions of a primary backup copy in parallel according to a specific embodiment.

FIG. 2 shows a block diagram of a distributed data protection platform or system 205. In a specific embodiment, systems and techniques are provided for cloning in parallel different portions or blocks of a primary backup copy. As shown in the example of FIG. 2, the system includes a backup management server 210, a first backup storage appliance A 215A, a second backup storage appliance B 215B, and hosts 217, each of which are interconnected by a network 221. Each storage appliance may include a set of disks or other media to store backup data and a controller to service requests.

The network, backup management server, and storage appliances may be as shown in FIG. 1 and described in the discussion accompanying FIG. 1. For example, the server, storage appliances, or both may include a processor, memory, network interface, input/output (I/O) controller, and storage connected by a bus architecture or any interconnection scheme serving to link the subsystems.

The backup management server includes a backup application server program 218, a cloning manager 221, and storage 224. Storage 224 includes a backup index 227A and a backup media database 227B.

The backup application server program coordinates with the backup application client (see FIG. 1) and storage appliance server programs to backup client data to backup storage appliance 215A, index or identify the data that was backed up, record information about the backup media and location of the backed up data, and recover or restore the data from the backup storage appliance to the clients. A primary backup copy 229A stored on first storage appliance 215A may include one or more backed up files, database (e.g., relational database), email, file system, documents, virtual machines, or any other type of data. The data may include data from a single client or multiple clients.

In a specific embodiment, at a scheduled or on-demand backup request, the backup application server program calls or instructs the backup application client program to prepare for a backup. A stream is established between the client and backup storage appliance. The stream may be referred to as a backup stream, savestream, or saveset stream. A saveset refers to a unit of data that is backed up. A saveset may include one or more files, file systems, or both on a single client. One stream is created for each saveset that is backed up. Specified files, objects, or data may be sent in a data stream from the client to the backup server to the backup storage appliance.

The backup application maintains information about a backup such as which files were backed up in index 227A. The index enables users, such as backup administrators, to browse a re-creation of the client's file system as it existed at a specified point in time, and to mark one or more files for recovery or restore. The backup application maintains entries for each backed up saveset and volume in backup media database 227B. The entries describe the storage location of data and the lifecycle status of all savesets and volumes managed by the backup management server.

The cloning manager includes a scanner 240 and a configurator 245. The cloning manager is responsible for creating a clone 229B of primary backup copy 229A. The clone may be stored at second backup storage appliance 215B. In particular, while the primary backup copy can be used to restore or recover data to a backup client it is desirable to provide redundancy. To provide redundancy, clone 229B of the primary backup copy is created at second backup storage appliance 215B. The clone represents or is a complete copy or replica of the primary backup copy. A clone may include a complete copy of a volume. A clone may include a complete block level copy. The location of a data block on the clone disk image file may be the same as the location of a corresponding data block on the source disk image file. In other words, the ordering or sequence of data blocks on the clone disk image file may be the same as the order or sequence of corresponding data blocks on the source disk image file. Using cloning to make a copy of the primary backup helps to ensure fidelity because the clone can be—block-for-block—the same as the original source. If the primary backup copy is corrupted, compromised, damaged, or otherwise unavailable, data on a backup client can still be recovered via the clone.

Cloning can be a very time-consuming and computing intensive process—especially in cases where the primary backup copy is very large, e.g., several terabytes (TB) or more. Cloning is a slow process because it is predominately sequential. The process typically involves a sequential reading each data block or chunk of a source and copying, writing, transmitting, or streaming the content to a target or destination device.

The system shown in FIG. 2 provides data partitioning techniques so that a cloning operation can proceed in parallel, simultaneously, or concurrently with another cloning operation. In particular, the scanner is responsible for scanning a disk image file that includes the primary backup copy to split, divide, or partition an amount or total amount of data to be cloned among hosts 217. The configurator is responsible for provisioning the hosts and assigning the hosts a portion of the amount of data to be cloned.

In a specific embodiment, the hosts are virtual machines running on one or more host computers. The host computer can be a general purpose computer with software and hardware. For example, physical hardware 250 may include a processor, storage, input/output (I/O) controller, network interface, and memory each of which may be interconnected by a bus architecture or any interconnection scheme. The host computer hosts any number of virtual machines (e.g., VM 1 . . . VM N). For example, there can be a single virtual machine or multiple virtual machines (e.g., two or more virtual machines). The host uses virtualization software 255 to run the virtual machines, virtual devices, or both. The virtualization software may include a hypervisor. The hypervisor is a thin layer of software between the hardware and virtual machines. The hypervisor is responsible for ensuring partition isolation and managing memory. The hypervisor or other virtualization software component can create, run, and manage the virtual machines.

Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform. A virtual machine may include a guest operating system, guest applications running on the guest operating system, and virtual hardware. The virtual hardware represents a hardware state of the virtual machine. Virtual hardware refers to the resources allocated to the virtual machine and is mapped to the hardware platform. The virtual hardware may include a virtual disk, virtual processor, virtual system memory, and various virtual devices for which the guest OS may include corresponding divers. Virtual devices may include, for example, a virtual graphics adapter, a virtual network adapter, a virtual input/output (I/O) device, or the like. Each virtual machine may be assigned an identifier such as an Internet Protocol (IP) address, globally unique identifier (GUID), or both.

The configurator provisions the hosts with cloning engines. For example, a host 260A may be provisioned with a cloning engine 265A, a host 260B may be provisioned with a cloning engine 265B, and so forth. Provisioning may include communicating with virtualization software of the host computer, such as via an application programming interface (API), to create a virtual machine, allocate resources (e.g., memory, storage, or processing), configure, install application programs, and so forth. The cloning engines, upon receipt of their cloning assignments, access their assigned portions or blocks of the disk image file having the primary backup, read their respective portions, and copy the data to the clone target (e.g., second backup storage appliance 215B).

The data copied to the second backup storage appliance may be stored as individual clone sets. An assembly module 270 at the storage appliance is responsible for assembling, chaining, consolidating, combining, or synthesizing the individual clone sets into clone 229B which represents a complete copy or clone of the primary backup copy.

It should be appreciated that the components and modules shown in FIG. 2 can be functional entities where implementation of the functions can vary. For example, in some cases the backup application server program and cloning manager are separate code modules. In other cases, the backup application server program and cloning manager are combined into one code module.

Figure 3:
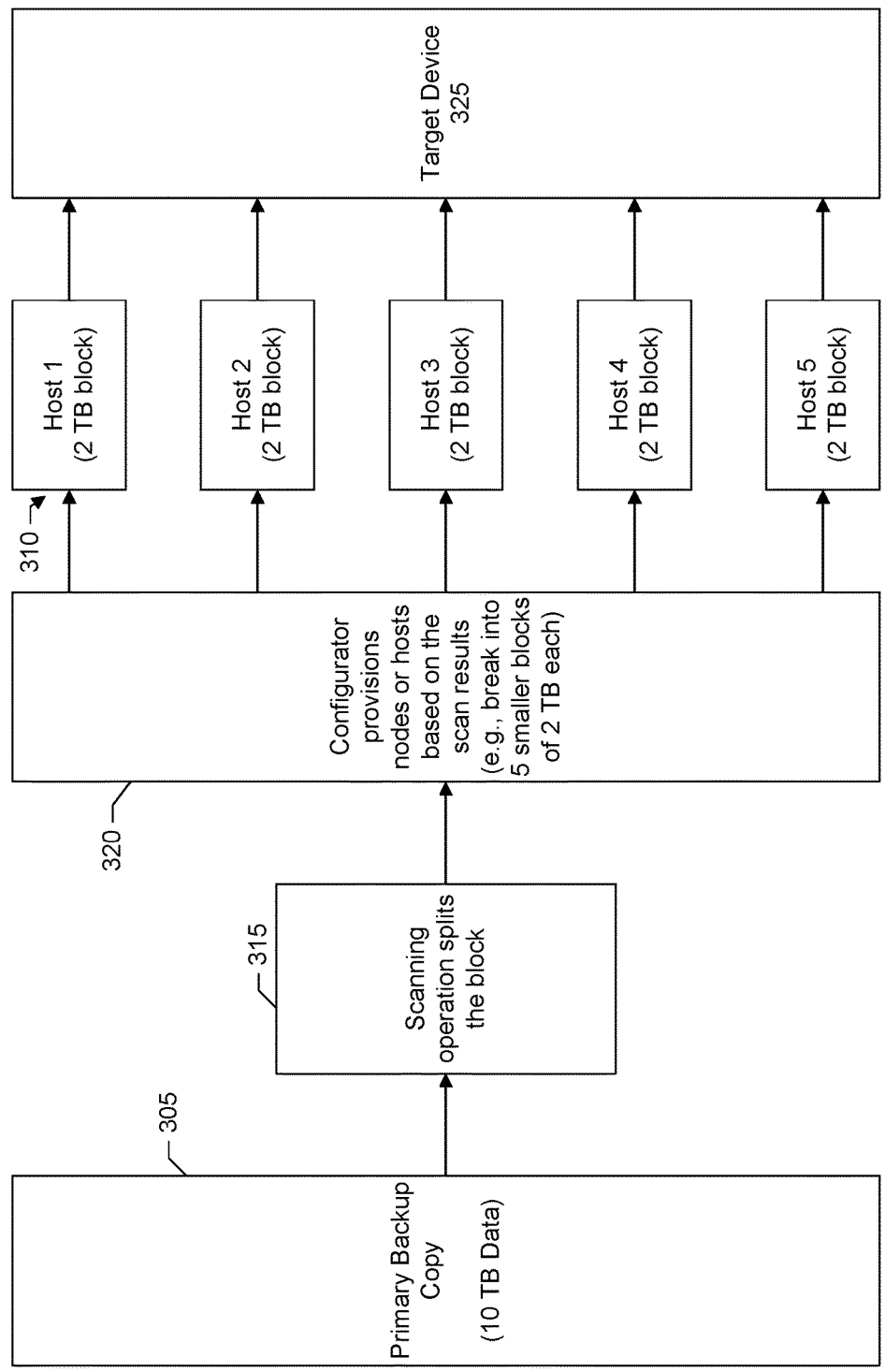
FIG. 3 shows high-level architecture and flow of a parallel cloning process according to a specific embodiment.

FIG. 3 shows a high-level architecture and flow of a distributed data protection technique involving cloning according to a specific embodiment. FIG. 3 shows an example of logically partitioning, splitting, or assigning different portions of a primary backup copy to different hosts to perform cloning processes and operations. In the example shown in FIG. 3, there is a primary backup copy 305 having, for example, 10 terabytes (TB) of data and there are five hosts 310. It should be appreciated that there can be any number of hosts (e.g., 1, 2, 3, 4, 5, 6, 7, 8, 9, 10, 15, or more than 15 hosts). There is a scanning operation 315 and a configurator 320.

The configurator provisions the nodes or hosts based on the scan results. In this example, the scanning operation splits the 10 TB into five 2 TB blocks. The configurator assigns each of the five hosts a 2 TB block of the primary backup copy to clone or copy to a target device 325. Once the five 2 TB blocks have been copied to the target device, the five blocks are consolidated. In a specific embodiment, the blocks are consolidated using an API of the backend device such as Data Domain. The blocks may be synthesized into one block based on their sequence or order in the corresponding primary backup copy.

As discussed above, cloning or equivalent techniques refer to creating one or more copies to another location, media, or both. This operation in itself is predominantly sequential or pre-set. In a specific embodiment, techniques of disk based backup protection and distributed data analytic techniques are applied to optimize or improve the process. Multiple or parallel data processing and streaming can cut the operation multifold.

Consider, as an example, the following sequence of operations as highlighted in FIG. 3. As discussed above, in this example there is 10 TB of data to be cloned. Generally, a cloning operation requires reading all the blocks sequentially which is time-consuming and can negatively impact service level agreements (SLAs).

In a specific embodiment, the amount of data to be copied is scanned. As discussed above, assuming, for example, that there are five hosts, the 10 TB is split into five 2 TB blocks. That allows for a parallel copying of 2 TB at each host. This improves the overall clone operation speed. Once all the blocks have been placed or copied to the target device (e.g., Data Domain), the blocks can be synthesized. In this example, there is a Block1, Block2, Block3, Block4, and Block5 of 2 TB each which upon reaching the target device can then be synthesized or chained together. In a specific embodiment, a technique referred to as VSF (virtual synthetic full) or other equivalent technique is applied to synthesize the blocks into a clone of the primary backup copy.

Figure 4:
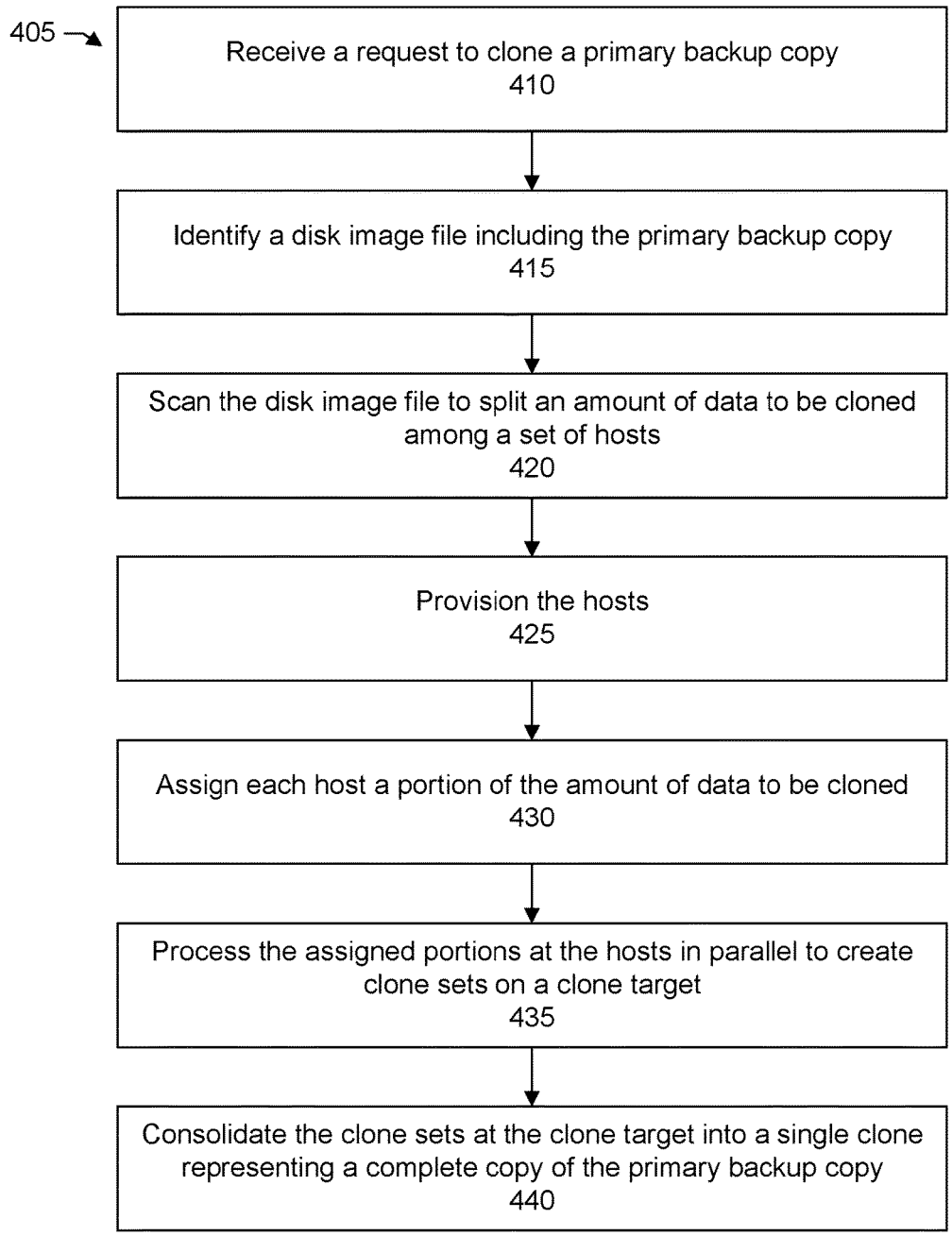
FIG. 4 shows a flow of a process of parallel cloning according to a specific embodiment.

FIG. 4 shows a flow 405 of a process for distributed data partitioning and parallel cloning according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, the cloning manager receives a request to clone a primary backup copy. The request may be an on-demand request or may be in response to a pre-determined or scheduled cloning operation. In a step 415, the cloning manager identifies based on the request a disk image file that includes the primary backup copy. In a specific embodiment, the primary backup copy is a completed backup of one or more backup clients. In other words, in this specific embodiment, cloning is performed after the primary backup copy has been performed. In order to speed the primary time-to-protect, the primary backup copy may have been written to a single target that is local to the system being protected. The primary backup copy may represent the first, initial, only, or original backup of the one or more backup clients. In a step 420, the disk image file is scanned to split, partition, or divide an amount of data to be cloned among a set of hosts. In a step 425, the hosts are provisioned.

Figure 5:
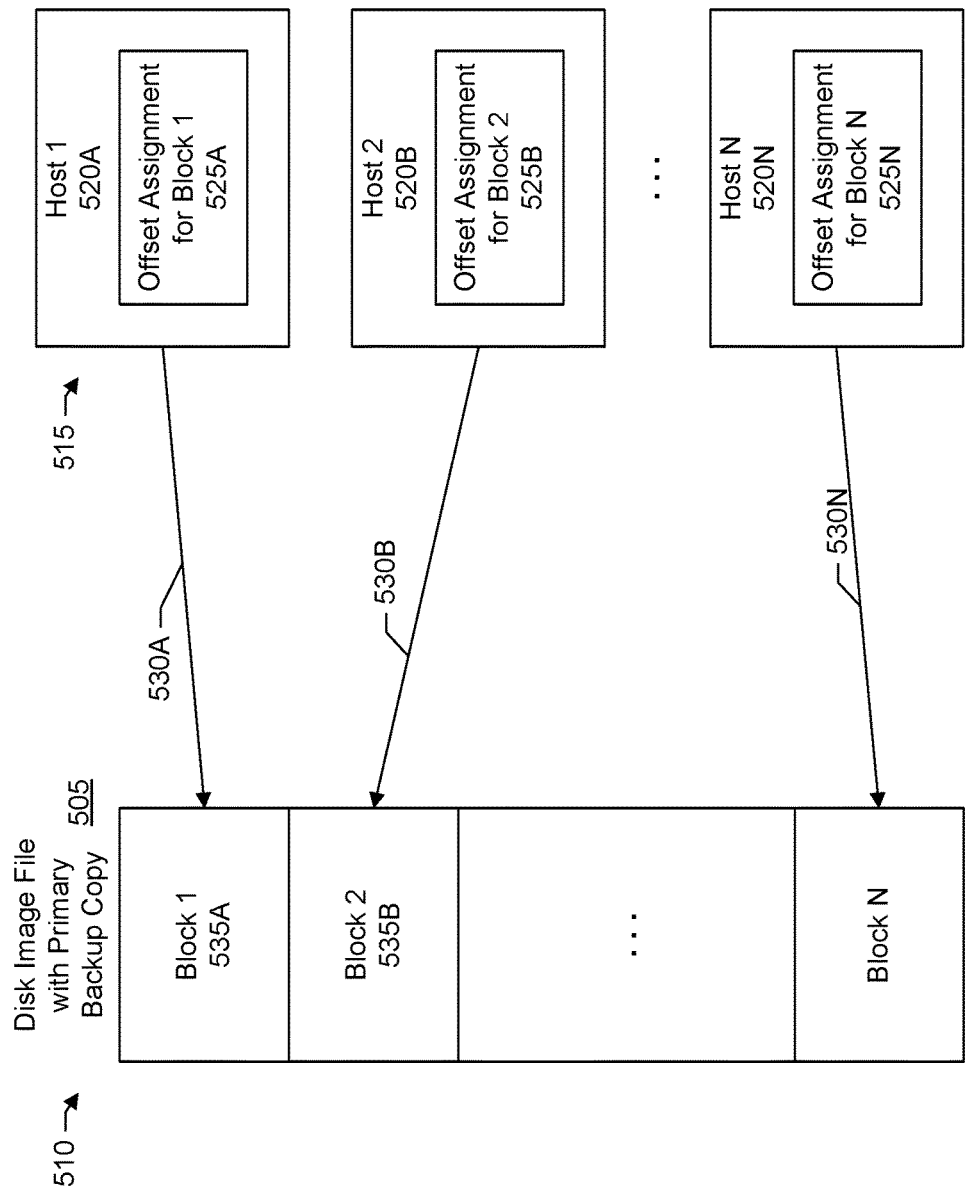
FIG. 5 shows a block diagram of block cloning assignments distributed to the hosts according to a specific embodiment.

In step 430, each host is assigned a block or a portion of the amount of data to be cloned. FIG. 5 shows a block diagram illustrating assignments. In the example shown in FIG. 5, there is a disk image file 505. The disk image file includes a primary backup copy and has been logically split into a set of blocks or logical blocks 510. In a specific embodiment, a particular block on the disk image file is identified, specified, addressed, or referenced by its offset. Block offset assignments are distributed to a set of hosts 515. A block offset assignment identifies a particular block that the host is to clone or copy.

For example, a first host 520A receives a first offset assignment 525A. A second host 520B receives a second offset assignment 525B. The first offset assignment includes an address or offset that identifies 530A a first block 535A of the disk image file. The second offset assignment includes another address or offset that identifies 530B a second block 535B of the disk image file, different from the first block, and so forth. In other words, a block represents a portion or at most a portion of the disk image file having the primary backup copy that the respective host is responsible for processing (e.g., cloning or copying to the clone target).

In a specific embodiment, the blocks are of a fixed sized. This allows a block to be identified using only an offset. The number of blocks may be determined based on the number of hosts. The number of blocks may be equal to the number of hosts. For example, if there are five hosts the disk image file including the primary backup copy may be logically split into five blocks. A size of block may be determined by dividing a size of the disk image file (dividend) by the number of hosts (divisor). The size of the block can include the resulting quotient and reminder. The size of the block represents the amount of data that a particular host is responsible for cloning. The size of the disk image file represents the total amount of data that is to be cloned.

In another specific embodiment, the blocks are of variable sizes and a block may be identified using an offset and corresponding size or length. Variable sized blocks may be used in cases where different hosts have or are allocated different amounts of resources. For example, a host that is allocated more resources than another host may be assigned a larger-sized block to process as compared to the other host. The cloning manager can track each host that has been provisioned and the resources allocated to a particular host. Tracking the resources allows the cloning manager to decide which host will process which block. Using variable sized blocks helps to prevent hosts with fewer resources from being overloaded and becoming the bottleneck in the overall cloning process.

Figure 6:
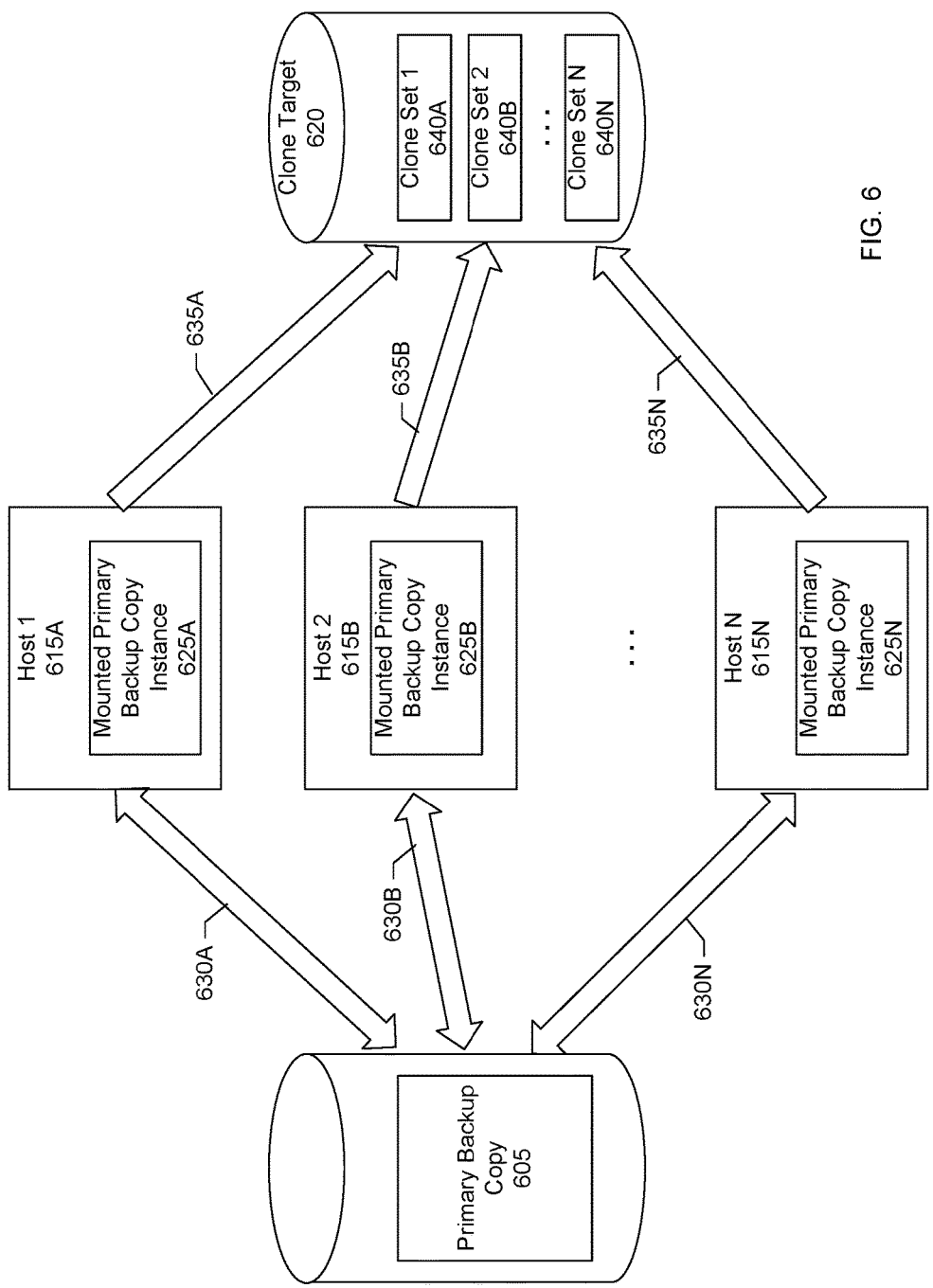
FIG. 6 shows a block diagram of the hosts executing their respective block cloning assignments according to a specific embodiment.

Referring back to FIG. 4, in a step 435, the hosts process their assigned portion or block of the disk image file having the primary backup copy to create clone sets on the clone target. FIG. 6 shows a block diagram illustrating the processing and cloning operations performed by the hosts. The processing or cloning operations performed by a particular host may include creating a clone set on the clone target, reading the content or data of a block assigned to the particular host, and copying, transmitting, sending, or streaming the content to the clone set on the clone target.

Specifically, as shown in the example of FIG. 6, there is a disk image file including a primary backup copy 605, a set of hosts (e.g., hosts 615A, B . . . N), and a clone target 620. An instance of the primary backup copy is mounted on the hosts (e.g., instance 625A, B . . . N). The instance provides an interface to the primary backup copy. The instance can include memory and processes associated with accessing the primary backup copy. Mounting an instance of the primary backup copy at a host is a relatively fast process. In a specific embodiment, each host reads only its assigned block or portion of the primary backup copy. For example, host 615A reads 630A a first block assigned to host 615A. Host 615B reads 630B a second block assigned to host 615B, different from the first block, and so forth.

Each host transmits, copies, or streams a copy of the respective block contents to the clone target. For example, host 615A transmits 635A a copy of content from the first block to a first clone set 640A created on the clone target. Host 615B transmits 635B a copy of content from the second block to a second clone set 640B created on the same clone target, and so forth.

A host performs its processing tasks in parallel with another host. A host may perform its processing tasks independent of another host. For example, while the first host is reading the first block, the second host may be reading the second block. While the first host is reading the first block, the second host may be transmitting a copy of the content of the second block to the clone target. While the first host is transmitting a copy of the content of the first block to the clone target, the second host may be transmitting a copy of the content of the second block to the clone target.

In other words, during the reading of the first block by the first host, the second host may be reading the second block. During the reading of the first block by the first host, the second host may be transmitting a copy of the content of the second block to the clone target. During the transmitting of a copy of the content of the first block by the first host to the clone target, the second host may be transmitting a copy of the content of the second block to the clone target.

Referring back to FIG. 4, in a step 440, the clone sets at the clone target are consolidated into a single clone representing a complete copy of the primary backup copy. FIG. 9 shows a flow 905 of a consolidation process. In a step 910, the clone target receives from the hosts copies of portions (e.g., blocks) of the primary backup copy as clone sets. Each clone set may have a sequence number indicating its respective position or order for a clone of the primary backup copy.

In other words, in a specific embodiment, the blocks of the disk image file including the primary backup may be numbered to indicate a respective block's position or order within the disk image file. The numbers or sequence numbers allow the corresponding clone sets to be assembled or consolidated in the proper corresponding order.

Figure 10:
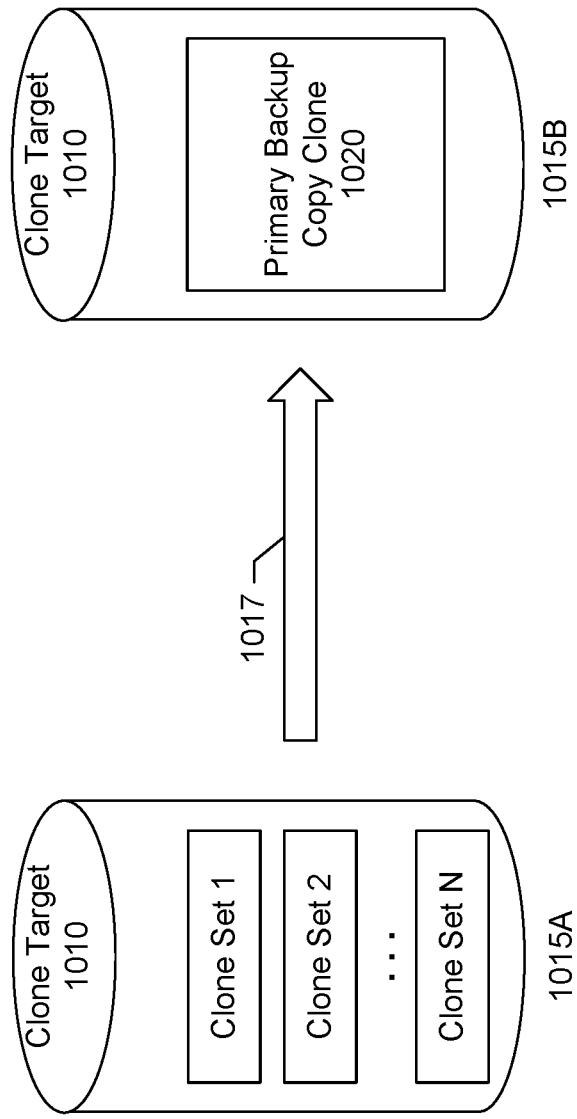
FIG. 10 shows a block diagram of a clone target in first and second states according to a specific embodiment.

In a step 915, the clone sets are assembled or consolidated according to their respective sequence numbers to create the clone. For example, FIG. 10 shows a block diagram illustrating the assembly or consolidation process. In this example, a clone target 1010 is shown in a first state 1015A and a second state 1015B, after the first state. In the first state, there are clone sets 1 . . . N. In the second state the clone sets have been consolidated or synthesized 1017 into a complete clone 1020 of the primary backup copy.

Referring back to FIG. 9, in a step 920, an entry may be generated in the backup media database indicating that the clone of the primary backup copy has been created. For example, upon consolidating the clone sets, the assembler at the clone target may notify the cloning manager (or backup application) that the cloning has been completed so that the backup media database can be updated.

These data partitioning and parallel cloning operations can dramatically reduce the time required to generate a clone. In a specific embodiment, distributed data protection (e.g., cloning) is achieved using data partitioning methods. The overall cloning operation (or any similar operation involving movement of a primary copy to a secondary such as replication, staging, or archiving) can be cut down significantly. Further, the server associated with the primary backup copy and will not be locked for a long time period. The parallel cloning operations allow the server to be made available very quickly, which in turn leads to higher availability and reliability. In a specific embodiment, the system provisions as many nodes as desired based on the scanning.

Figure 7:
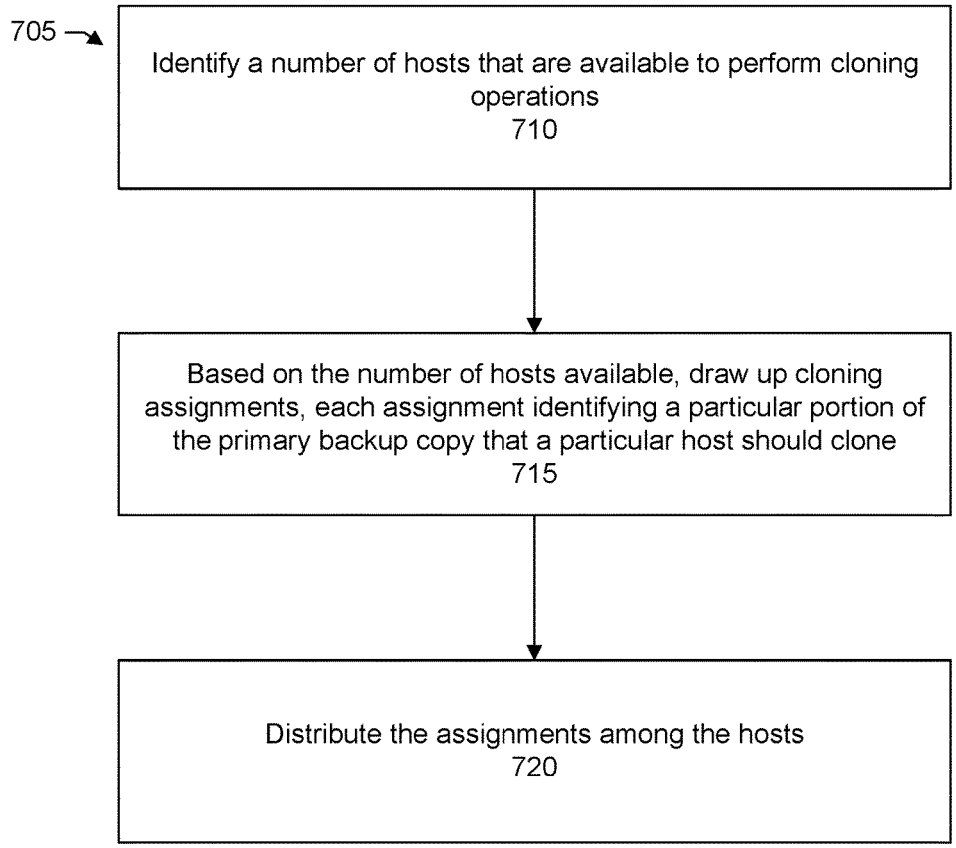
FIG. 7 shows a flow of a process for provisioning hosts according to a specific embodiment.

More particularly, referring now to FIG. 7, a flow 705 is shown of a process for the static provisioning of hosts according to a specific embodiment. In this specific embodiment, there is a preset or predetermined number of hosts that are available to perform cloning operations or processes. In a step 710, the configurator identifies a number of hosts that are available to perform cloning operations. For example, the configurator may issue a query to a virtual machine host computer to request the number of virtual machine hosts that are available on the host computer. The virtual machine host computer can then respond with the number of available virtual machine hosts. The configurator receives the number of hosts available.

In a step 715, based on the number of hosts available, cloning assignments are drawn up. Each cloning assignment identifies a particular portion or block of the disk image file having the primary backup copy that a particular host should clone. In a step 720, the assignments are distributed to the respective hosts (see, e.g., FIG. 5).

Figure 8:
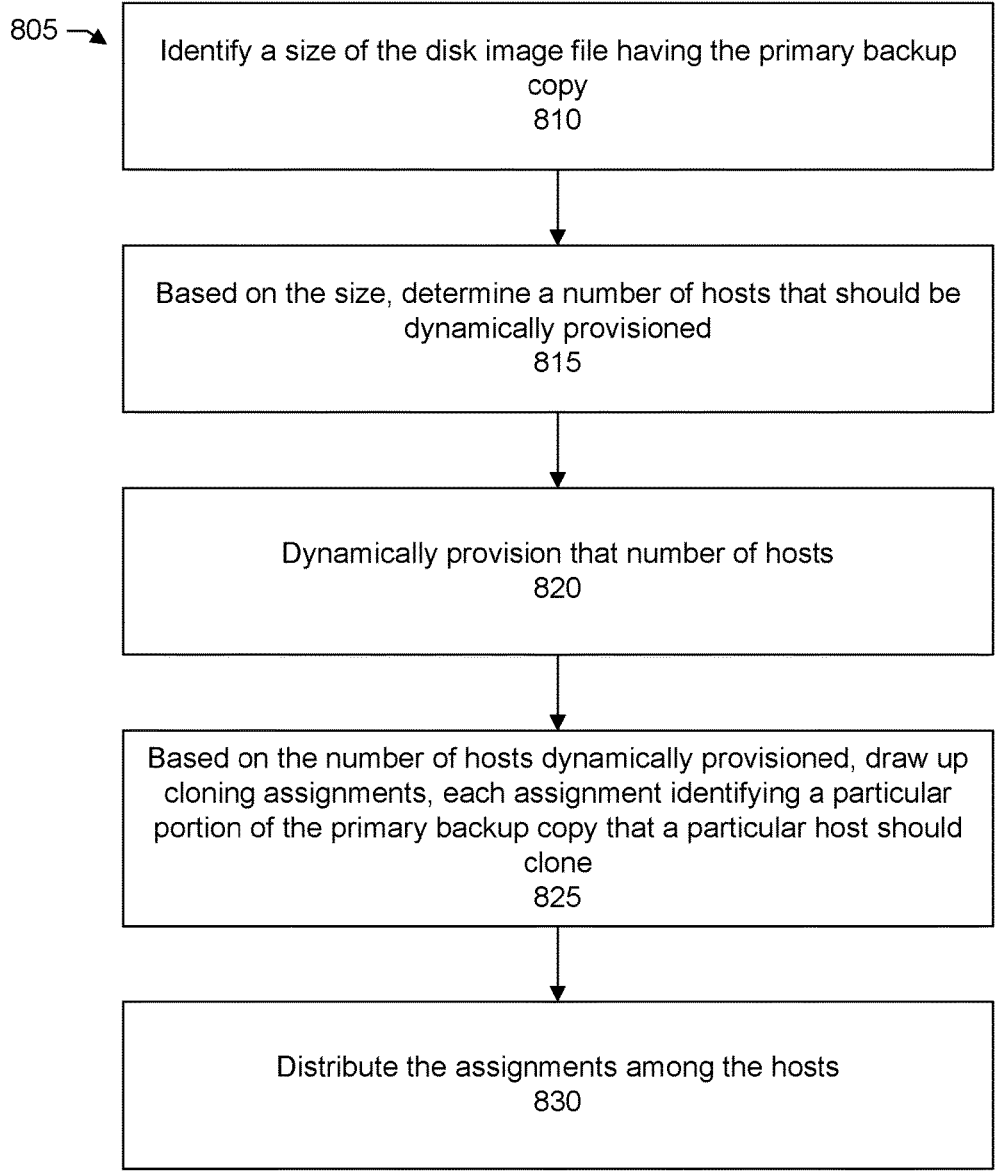
FIG. 8 shows a flow of a process for dynamically provisioning hosts according to a specific embodiment.

FIG. 8 shows a flow 805 of a process for the dynamic provisioning of hosts according to another specific embodiment. In this specific embodiment, the number of hosts is not predetermined. Specifically, in a step 810, a size of the disk image file having the primary backup copy is identified. In a step 815, based the size, the configurator determines a number of hosts that should be dynamically provisioned. The number of hosts to dynamically provision may vary proportionally to the size. Thus, a greater number of hosts may be provisioned for a primary backup copy having a large size as compared to hosts provisioned for a primary backup copy having a small size. This can help to use resources efficiently by balancing the sometimes competing desires to speed cloning operations while ensuring that resources are available for other tasks.

In a specific embodiment, the size of the disk image file is one factor among other factors that the configurator may use to determine the number of hosts that should be dynamically provisioned. Other factors may include the time or time window allotted to the cloning, the desired block size to be assigned to a particular host, and others. For example, a short time window allotted to the cloning may result in more hosts being provisioned as compared to a long time window allotted to the cloning. Similarly, a small desired block size to assign may result in more hosts being provisioned as compared to a large block size. A factor may be weighted differently than another factor in order to give priority to a particular factor. There can be an algorithm that evaluates the factors and dynamically provisions a specific number of hosts based on the evaluation.

In a step 825, based on the number of hosts dynamically provisioned, cloning assignments are drawn up for each host. Each assignment identifies a particular portion of block that the respective host is responsible for cloning. In a step 830, the assignments are distributed among the hosts.

In another specific embodiment, distributing the block assignments that the hosts are responsible for may be staged. For example, a set of assignments may be divided into first and second groups. The number of block assignments in one group may be the same as or different from a number of block assignments in another group depending upon factors such as the desired time to complete the cloning, current time, host availability, and other factors. For example, cloning may be scheduled for off-peak hours, different portions of cloning may be performed during different time periods, and so forth.

A first group of block assignments may be distributed to the hosts. After the hosts have processed or cloned the blocks identified in the first group of block assignments, the second group of block assignments may be distributed to the same or different hosts. The staging can help to conserve network bandwidth and other computing resources. For example, the staging can help to ensure that a network is not overloaded by the concurrent processing and transmission of many block copies corresponding to a large primary backup copy.

Referring now to FIG. 2, in a specific embodiment, the cloning manager includes a polling engine or logic to help track the status of a cloning operation. For example, the cloning manager may periodically poll the hosts, clone target (e.g., second backup storage appliance), or both to request a report on the progress of the cloning. Instead or additionally, the hosts, clone target, or both may send to the cloning manager periodic updates indicating the progress of the cloning.

The polling and updates helps to provide backup administrators with visibility into the status of the cloning operation. The cloning manager may include a management console having a graphical user interface (GUI) that displays on an electronic screen status information associated with one or more cloning operations. The status information may include an identification of each host performing cloning, an estimated time, duration, or time remaining for a particular host to complete its cloning operations, a status of the host (e.g., cloning in progress, cloning error, or cloning complete), a total estimated duration, time or time remaining for the overall cloning operation, a status of the clone target (e.g., clone sets A and B received, clone set C not yet received; clone synthesis complete), timestamps indicating when a particular host completed its cloning, and so forth, or combinations of these.

Periodically requesting status reports, responding to status requests, or both requires a certain amount of computing resources. In a specific embodiment, a polling interval, update interval, or both can be dynamic or vary based on the size of the block to be cloned. The polling interval, update interval, or both may vary proportionally with the size of the block to be cloned. For example, based on the size of the block to be cloned, the resources allocated to a host to clone the block, or both, an estimated time for the host to complete the cloning of the block is calculated. In a specific embodiment, the host is not polled for status until after the estimated time has elapsed or passed. This allows the host to focus its resources on the cloning operations.

The disk image file including the primary backup copy may be formatted as a virtual disk or virtual hard disk (e.g., Vdisk, VHD, or VHDx). The clone sets corresponding to copies of portions of the primary backup copy and the clone that is synthesized from the clone sets may likewise be formatted as virtual hard disks.

In a specific embodiment, the disk file including the primary backup copy is stored as a sparse disk file. In this specific embodiment, a disk file conversion mechanism is utilized to convert certain types of disk files, such as sparse disk files, into a traditional native disk file that can be accessed via a traditional block-based access method (e.g., a small computer system interface (SCSI) and Fibre channel (FC) interface). The term of a sparse disk file refers to a disk image file having data blocks that are sparsely distributed or located within the disk image file. A native disk file refers to a traditional disk image file having data blocks that are contiguously located within the disk image file. An example of a sparse disk file includes a virtual hard disk (VHD) or Hyper-V™ VHD (VHDx) file that typically requires a specific recovery method or file system in order to restore, clone, or copy the disk content embedded within the sparse disk file, since the payload data blocks are not contiguously located. A native disk file may not include VHD/VHDx data. A native disk file may be referred to as a pure disk image or a flattened disk image.

In one embodiment, based on the sparse disk file, a native disk file is instantly or near-instantly created using a fast-copy method. The term of "fast-copy" method refers to creating a target file (e.g., native disk file) by including only pointers to the payload blocks of a source file (e.g., sparse disk file), without copying the actual data blocks or content of the source file. The target file includes all the necessary information or metadata (e.g., master boot record or MBR, partition table(s), etc.) describing the actual disk image represented by the source file. The target file is then exposed to a client or host responsible for cloning via a block-based access interface. When the host client attempts to access the native disk file, the specific block or blocks of the content being accessed is then retrieved from the source file.

According to another embodiment, since a native disk file can be instantly or rapidly created from a sparse disk file, using the similar techniques multiple instances or copies of the native disk file can also be created from the sparse disk file. The multiple instances or copies of the native file can then be simultaneously mounted and exposed to multiple host client machines or virtual machines via a respective block-based access interface to enable the host clients to concurrently clone their assigned blocks of data stored in the respective native disk files. As a result, multiple host clients can concurrently clone different portions of the same primary backup copy stored in or referenced by the native disk files. Such cloning can be performed in a distributed manner and a final complete clone can be generated by combining the individual clone sets.

FIG. 11 is a block diagram illustrating a storage system 1104 according to one embodiment. The backup clients, network, and backup management server may be as shown in FIG. 1 and described in the discussion accompanying FIG. 1.

In one embodiment, storage system 1104 includes a backup/restore engine or software 1106 responsible for backing up, restoring data stored in storage system 1104, or both. Backup/restore engine 1106 includes backup module (or backup unit or backup logic) 1121 and restore module (or restore unit or restore logic) 1122. Backup module 1121 is configured or adapted to receive backup data streams from the clients and store the backup data streams in storage unit(s) 1108, with optional deduplication. Backup module 1121 may receive a backup request from any of the clients to initiate a backup operation. Alternatively, backup module 1121 may receive a backup instruction from management server 106 to back up data from any of clients to storage system 1104. Similarly, restore module 1122 is configured or adapted to restore the backup data stored in storage system 1104 to any of the clients, in response to a request from the clients, management server 106, or both.

In one embodiment, the backup data streams are stored in storage device 1108 of storage system 1104 in a form of sparse disk files 1110. Sparse disk files 1110 may further be deduplicated by deduplication engine 1107 and stored as part of deduplicated segments 1112, as well as metadata (e.g., fingerprints) associated with deduplicated segments 1112 (not shown). A sparse disk file refers to a disk image file having data blocks that are sparsely distributed or located within the disk image file, where each of the data blocks (also referred to as payload blocks) is referenced by an entry of a block allocation table (BAT) within the disk image file. An example of a sparse disk file includes a VHD or VHDx file that typically requires a specific access method or file system in order to access the disk content embedded within the sparse disk file, since the payload data blocks are not contiguously located.

In one embodiment, the cloning manager of the storage system includes a sparse disk file (SDF) to native disk file (NDF) converter (or converting logic) 1125 to convert sparse disk files 1110 into native disk files 1111. A native disk file refers to a traditional disk image file having data blocks that are contiguously located within the disk image file, which can be accessed based on an offset, block size, or both. Native disk files 1111 can then be mounted and exposed to hosts 217 (see, e.g., FIG. 2) responsible for cloning operations instantly via a block-based access interface or protocol (not shown), such as, for example, SCSI or Fibre channel interface. As a result, hosts 217 (see, e.g., FIG. 2) can instantly access disk content stored within sparse disk files 1110 without having to go through the complex access methods in order to access sparse disk files 1110.

In one embodiment, based on the sparse disk file, a native disk file is instantly created using a fast-copy method performed by a fast-copy and rebase module (or unit or logic, not shown). The term of "fast-copy" method refers to creating a target file (e.g., native disk file) by including only pointers or metadata referencing the payload blocks of a source file (e.g., sparse disk file), without copying the actual data blocks or content of the source file.

In this example, a native disk file includes all the necessary information or metadata (e.g., master boot record or MBR, partition table(s), etc.) describing the actual disk image represented by a corresponding sparse disk file. The native disk file is then mounted and exposed to a host client via a block-based access interface (e.g., SCSI or FC). When the host client attempts to access the native disk file, the specific block or blocks of the content being accessed is then retrieved from the sparse disk file. Any writes to the native disk file may be maintained in a separate file (e.g., child file, not shown) related to the native disk file, without modifying the sparse file. As a result, a native disk file represents an instant copy or snapshot of the sparse disk file.

According to another embodiment, since a native disk file can be instantly created from a sparse disk file, using the similar techniques multiple instances or copies of the native disk file can also be created from the sparse disk file as a source. The multiple instances or copies of the native file can then be simultaneously mounted and exposed to multiple hosts 217 (see, e.g., FIG. 2) via a respective block-based access interface to enable the hosts to concurrently clone their assigned data blocks stored in the respective native disk files. As a result, multiple host clients can concurrently clone different portions of the same data set stored in or referenced by the native disk files. Such cloning can be performed in a distributed manner and a final complete clone of the primary backup copy can be generated by combining the individual clone sets generated by each host.

Figure 12:
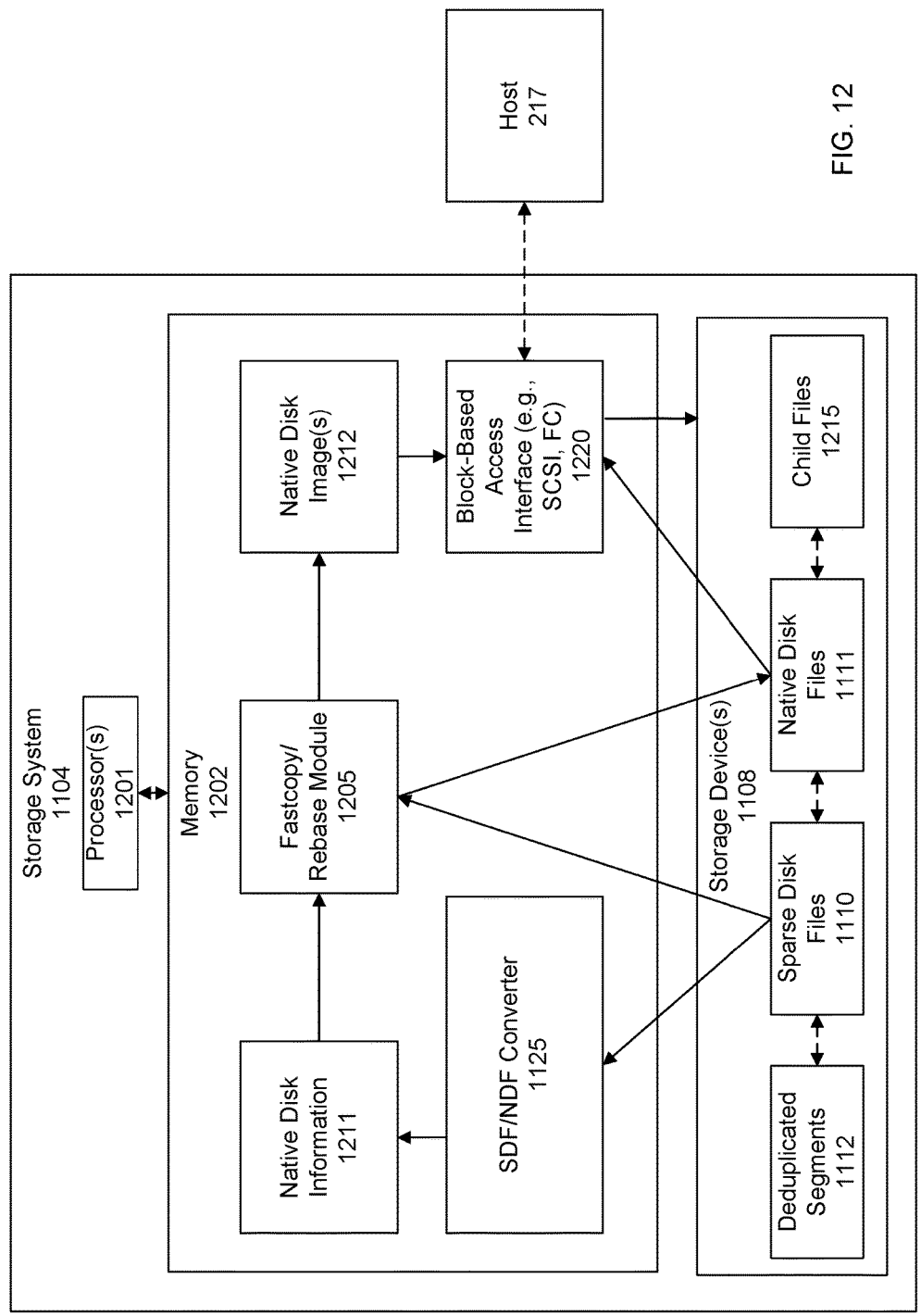
FIG. 12 shows another block diagram of the storage system according to a specific embodiment.

FIG. 12 is a block diagram illustrating an example of a storage system according to another embodiment. Referring to FIG. 12, storage system 1104 includes SDF/NDF converter 1125, in this example, implemented as a software component executed by processor 1201 in memory 1202. Processor 1201 may be a general-purpose processor (e.g., central processing unit or CPU) or a dedicated processing unit (e.g., ASIC or FPGA). Memory 1202 may be system memory of storage system 1104 or dedicated memory. In one embodiment, in response to a request for cloning a primary backup copy stored in storage system 1104, SDF/NDF converter 1125 is configured to identify a sparse disk file from sparse disk files 1110 based on the request.

SDF/NDF converter 1125 parses sparse disk file 1110 to obtain metadata of a corresponding native disk information, such as, for example, the MBR and other partition tables, and so forth. From the metadata, SDF/NDF converter 1125 can determine a configuration or disk layout of the native disk, such as, for example, a disk size and/or block size of the native disk to generate native disk information 1211. In one embodiment, SDF/NDF converter 1125 walks through entries of a block allocation table of sparse disk file 1110 to identify the related payload blocks in which the metadata of the native disk image is stored and to obtain the metadata of the native disk image. Based on native disk information 1211, fast-copy and rebase module 1205 constructs a native disk file having a layout described by native disk information 1211, without physically copying or moving the actual data content associated with sparse disk file 1110, to generate native disk image 1212. That is, instead of containing the actual data content of sparse disk file 1110, native disk image 1212 only contains metadata, such as, for example, pointers referencing the payload blocks of sparse disk file 1110. As a result, native disk image 1212 can be created instantly or near-instantly. Native disk image 1212 is then stored in storage device 1108 as part of native disk files 1111.

Native disk image 1212 can be instantly mounted and exposed to external host clients 217 via a block-based access interface 1220 such as SCSI or FC interface. For example, native disk image 1212 can be mounted as a SCSI drive accessible over a network. Native disk image 1212 can be accessed in a read/write mode, without having to jeopardize the original data content of sparse disk file 1110.

When host client 217 reads a particular assigned block or blocks from native disk image 1212, a file manager or block-based disk driver (not shown) can identify the corresponding block or blocks from sparse disk file 1110 based on the metadata (e.g., pointers) of native disk file 1111 to retrieve the data block or blocks and to return the blocks back to host client 217. If the host client writes or modifies a particular data block, the new or modified block is stored in a separate file as part of child files 1215 referenced by native disk files 1111, without altering the source, sparse disk files 1110. A child file contains only the difference between a newer version and a previous version of native disk file 1111, similar to an incremental backup with respect to a full backup represented by native disk file 1111.

In one embodiment, sparse disk files 1110 may be deduplicated, for example, by deduplication engine 1107 of FIG. 11, into deduplicated segments 1112. In such a scenario, instead of containing the actual data segments, sparse disk files 1110 contain references to deduplicated segments 1112 that are associated with the sparse disk files. For example, sparse disk files 1110 may contain fingerprints of deduplicated segments 1112. When data blocks of sparse disk files 1110 are accessed, for example, from native disk files 1111, the fingerprints of the data blocks are obtained from sparse disk files 1110 and the associated deduplicated segments are accessed based on the fingerprints via the deduplication engine. Deduplicated segments 1112 may be stored in one or more compression regions and one or more compression regions may be stored in one or more storage containers in storage device 1108. Alternatively, when native disk files are created, native disk files may directly contain fingerprints of the associated deduplicated segments 1112.

Figure 13:
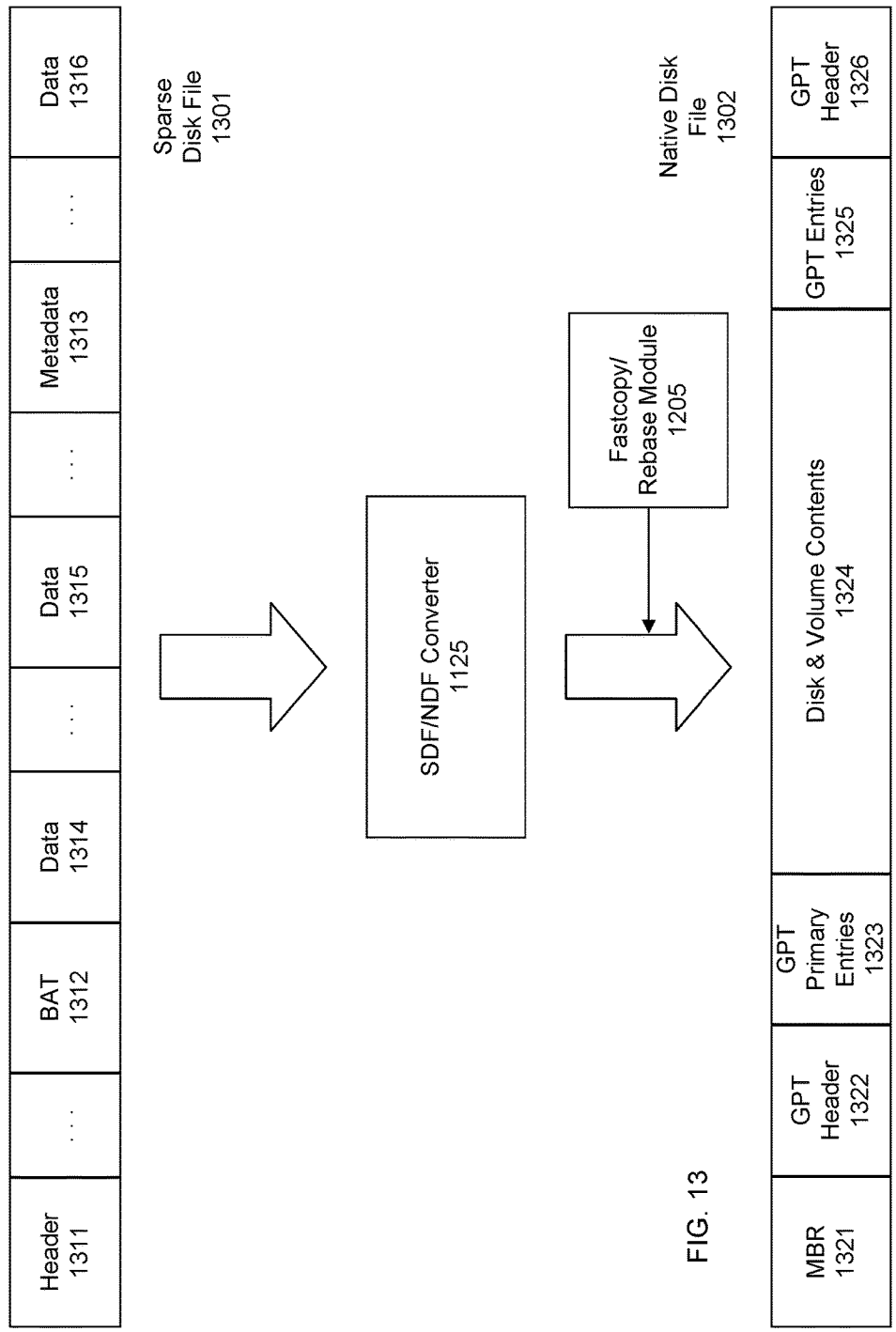
FIG. 13 shows a block diagram of a conversion of a sparse disk file to a native disk file according to a specific embodiment.

FIG. 13 is a block diagram illustrating a conversion process from a sparse disk file to a native disk file according to one embodiment. Referring to FIG. 13, in this example, sparse disk file 1301 includes, among others, header 1311, block allocation table 1312, data blocks 1314-1316 sparsely (e.g., non-contiguously or not in sequence) located and intertwined with other data such as metadata 1313.

Block allocation table 1312 includes information identifying or describing data blocks 1314-1316, also referred to as payload blocks. In one embodiment, SDF/NDF converter 1125 parses information of sparse disk file to obtain disk configuration information of native disk file 1302, such as, for example, MBR 1321, GUID (globally unique identifier) partition table (GPT) headers 1322 and 1326, GPT primary entries 1323, GPT secondary entries 1325, and so forth. GPT is a standard for the layout of the partition table on a physical hard disk using GUID. In addition, SDF/NDF converter 1125 constructs disk and volume content portion 1324 having pointers referencing the payload blocks (e.g., data blocks 1314-1316) of sparse disk file 1301.

Figure 14:
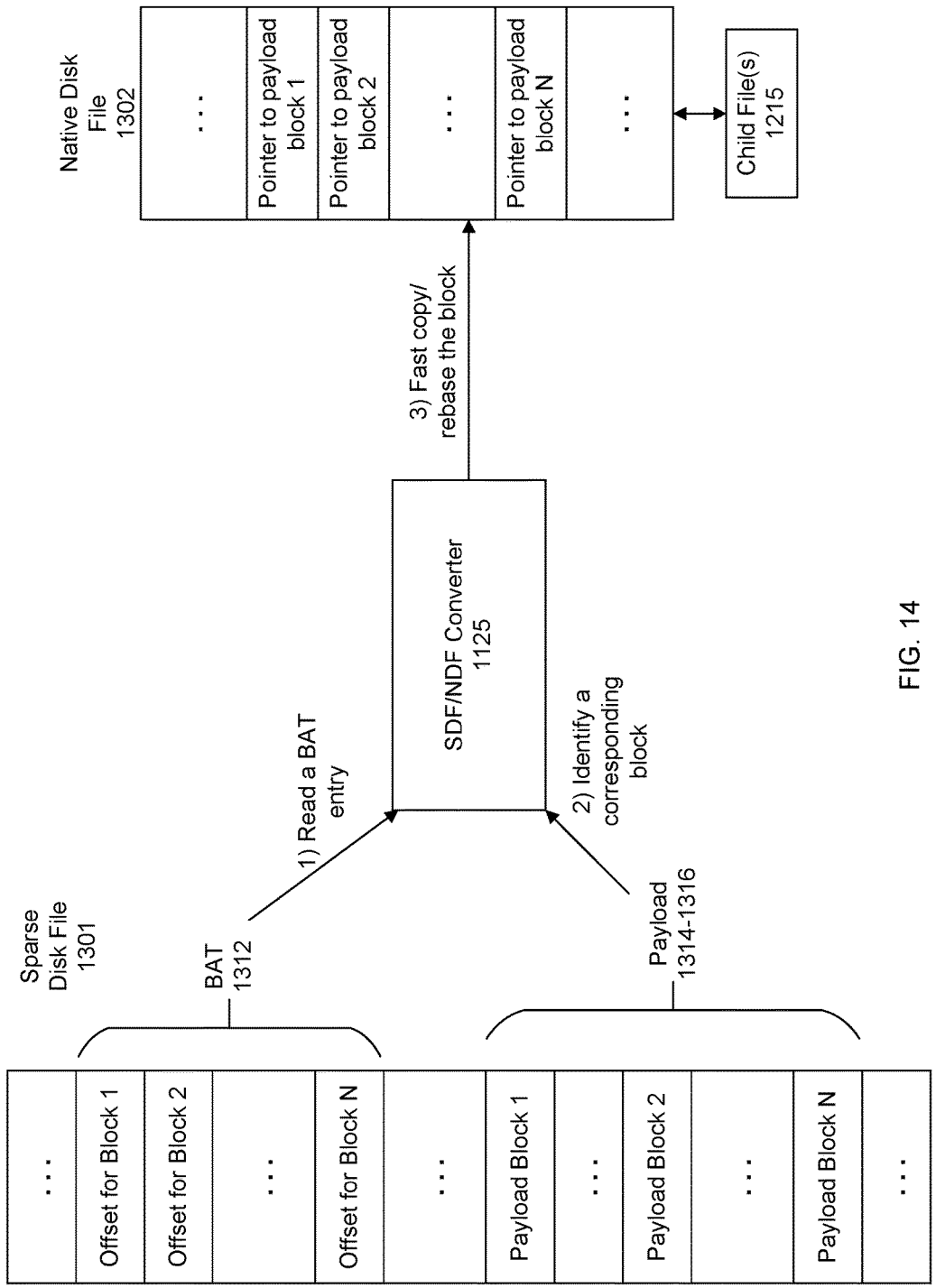
FIG. 14 shows a block diagram illustrating a process of converting a sparse disk file to a native disk file according to a specific embodiment.

In one embodiment, as shown in FIG. 14, SDF/NDF converter 1125 parses block allocation table or BAT 1312 to identify and access payload blocks 1314-1316. In one embodiment, BAT 312 includes multiple entries, each entry having stored therein an offset or pointer identifying a corresponding payload block of payload blocks 1314-1316. BAT 1312 is a region listed in the region table and includes a single contiguous array of entries specifying the state and the physical file offset for each block. In one embodiment, each of the payload blocks 1314-1316 is a fixed size block and an entry of BAT 1312 needs to store only an offset referencing the corresponding payload block.

Alternatively, payload blocks may be variable sized blocks in which each entry of BAT 1312 may further contain the size of the corresponding payload block. Based on the payload blocks 1314-1316, SDF/NDF converter 1125 can determine the metadata or layout of the native disk file, including the size of the native disk file, MBR, and partition tables, and so forth. SDF/NDF converter 1125 further creates native disk file 1302 having pointers referencing the data payloads of sparse disk file 1301. In one embodiment, if an entry of BAT 1312 contains a zero offset or a predetermined offset (e.g., out-of-range number), SDF/NDF converter 1125 may create a block in the native disk file and pad it with predetermined data such as zero, such that native disk file 1302 would have the size of a native disk that is specified and represented by sparse disk file 1301.

In one embodiment, sparse disk file 1301 is a VHD or VHDx file. Further detailed information of a VHD/VHDx file can be found in the VHDX specification version 1.00, entitled "VHDX Format Specification" published Aug. 25, 2012 by Microsoft® Corporation, which is incorporated by reference along with all other references cited. However, the techniques described herein can also be applied to other types of disk file having data blocks sparsely located.

Figure 15:
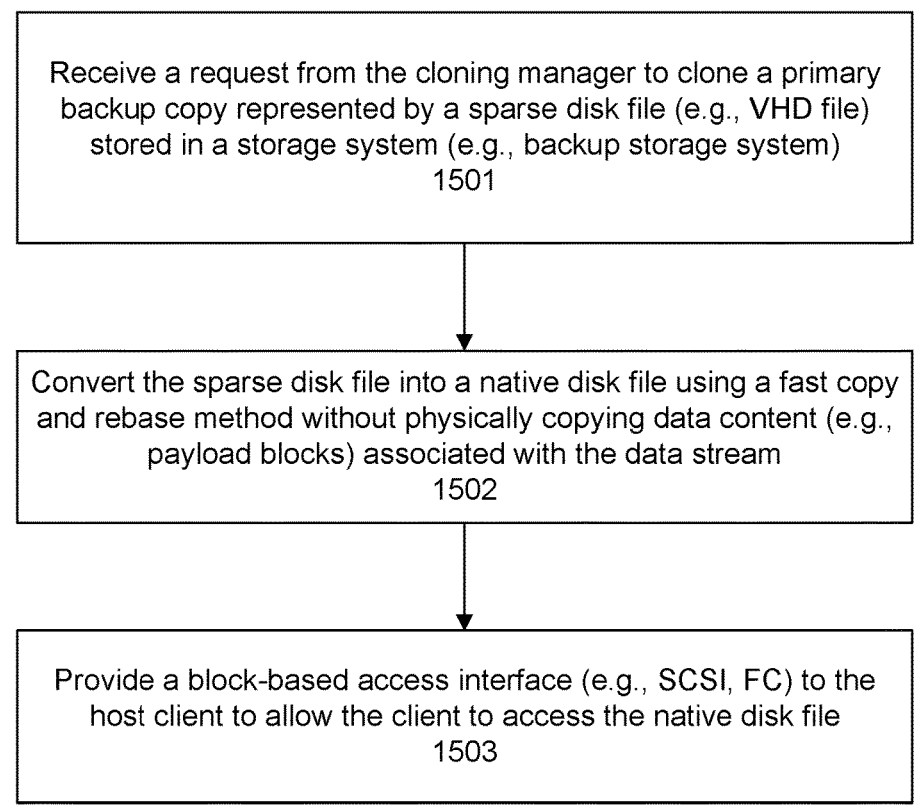
FIG. 15 shows a flow diagram of a process of providing instant access to data of a sparse disk file according to a specific embodiment.

FIG. 15 is a flow diagram illustrating a process of providing instant access of data of a sparse disk file according to one embodiment. Process 1500 may be performed by processing logic which may include software, hardware, or a combination thereof. For example, process 1500 may be performed by storage system 1104 of FIG. 11. Referring to FIG. 15, in a step 1501, processing logic receives a request from the cloning manager to clone a primary backup copy represented by a sparse disk file (e.g., VHD/VHDx file) stored in a storage system. In a step 1502, processing logic converts the sparse disk file into a native disk file, using a fast-copy and rebase method without physically copying or moving data content of the sparse disk file. In a step 1503, a block-based access interface (e.g., SCSI or FC) is provided to allow the host client to access the native disk file.

FIG. 16 is a flow diagram illustrating a process of providing instant access of data of a sparse disk file according to another embodiment. Process 1600 may be performed by processing logic which may include software, hardware, or a combination thereof. For example, process 1600 may be performed as part of operations involved in step 1502 of FIG. 15. Referring to FIG. 16, in a step 1601, in response to a sparse disk file (e.g., VHD or VHDx file), processing logic creates a new native disk file as a place holder having a size equal to the disk size specified by the sparse disk file, for example, by parsing or scanning payload blocks of the sparse disk file.

In a step 1602, processing logic parses the sparse disk file to identify or locate a block allocation table within the sparse disk file. As described above, the block allocation table includes multiple entries, each entry storing therein an offset or location within the sparse disk file at which the payload block is located. For each of the entries, in step 1603, processing logic performs a fast-copy and rebase operation on a corresponding payload block of the sparse disk file into the native disk file. In one embodiment, a disk block is created within the native disk file having a pointer or metadata referencing the corresponding payload block of the sparse disk file, without physically copying the actual content of the payload block of the sparse disk file.

FIG. 17 is a flow diagram illustrating a process of providing instant access of data of a sparse disk file according to another embodiment. Process 1700 may be performed by processing logic which may include software, hardware, or a combination thereof. For example, process 1700 may be performed as part of operations involved in step 1502 of FIG. 15. Referring to FIG. 17, in a step 1701, in response to a sparse disk file, processing logic creates a new native disk file having a disk size equal to the disk size specified or represented by the sparse disk file.

In a step 1702, processing logic reads the block allocation table from the sparse disk file and walks through entries of the block allocation table. For each entry of the block allocation entries, at step 1703, it is determined whether the entry contains a valid offset within the sparse disk file (e.g., a number within a predetermined range or size of the sparse disk file, in this example, a non-zero value). If so, in a step 1704, processing logic locates the corresponding payload block within the sparse disk file based on the offset and performs a fast-copy and rebase operation from the payload block to a new data block of the native disk file. If the entry contains a zero or a predetermined number, in a step 1705, processing logic creates or appends a new data block with a padded predetermined value such as zero. In a step 1706, if there are more entries in the block allocation table, the above operations are iteratively performed until all entries of the block allocation table have been processed.

Since a native disk file is created from a sparse disk file without having to physically copy content data of the sparse disk file, the native disk file literately represents a virtual copy of the sparse disk file, but in a form of a native disk format or a virtual native disk. Such a virtual native disk can be mounted as a block-based disk accessible via a block-based access interface or protocol, such as SCSI or FC interface. As a result, such a virtual native disk file can be created instantly or very quickly. According to one embodiment, multiple native disk files (e.g., virtual native disks) can be created from the same sparse disk file representing copies of the sparse disk file. Such multiple copies of native disk files can be simultaneously mounted and accessed by multiple host clients concurrently via a respective block-based access interface.

Figure 18:
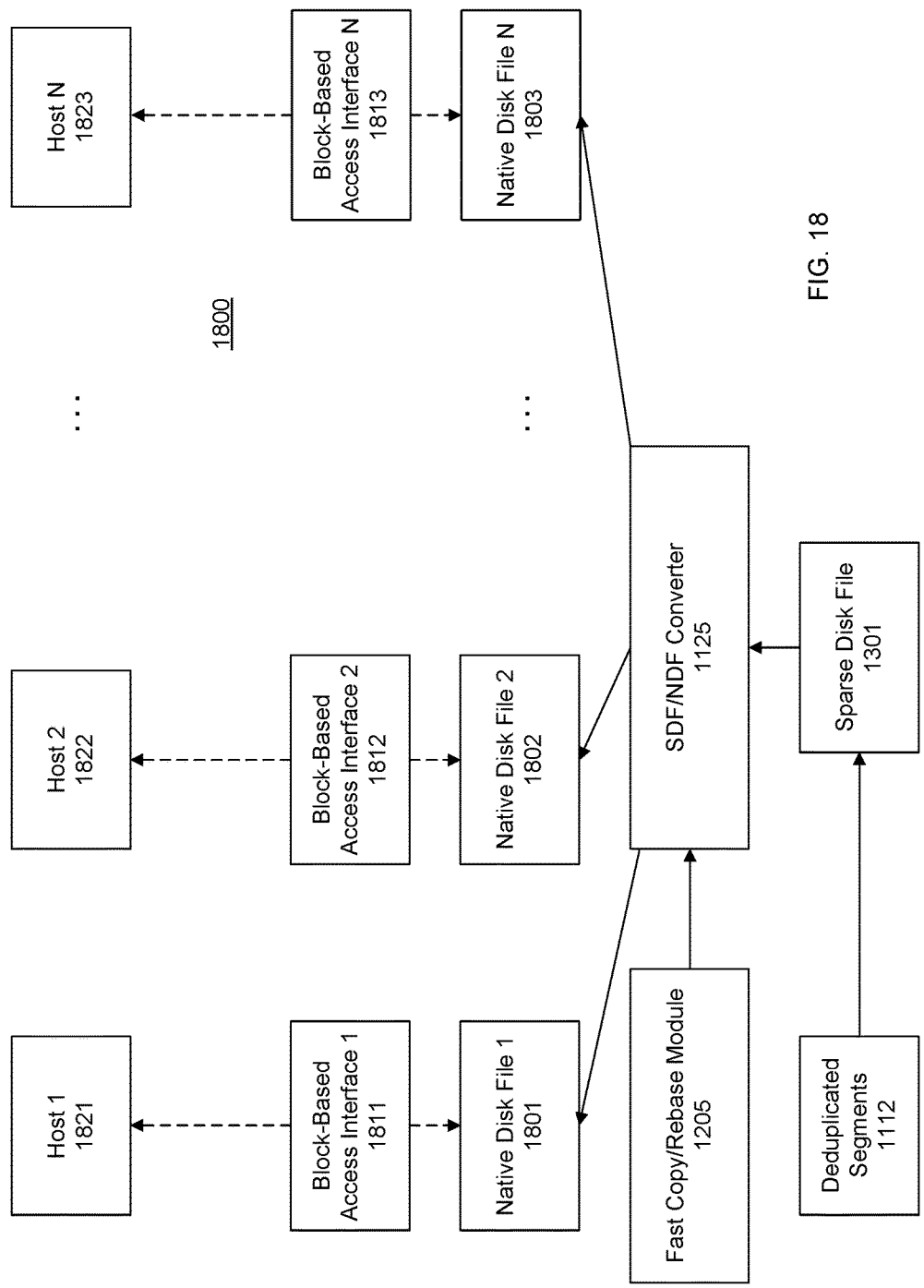
FIG. 18 shows a block diagram illustrating an example of a storage system in which multiple native disk files are created from a single sparse disk file for simultaneous access according to a specific embodiment.

FIG. 18 is a block diagram illustrating an example of a storage system in which multiple native disk files are created from a single sparse disk file for simultaneous access according to one embodiment. Referring to FIG. 18, system 1800 includes multiple native disk files 1801-1803 created by SDF/NDF converter 1125 based on sparse disk file 1301 using the techniques described above, such as fast-copy operations performed by fast-copy and rebase module 1205. Native disk files 1801-1803 can be concurrently mounted and accessed by multiple host clients 1821-1823 via block-based access interfaces 1811-1813 (e.g., SCSI, FC), respectively. In a specific embodiment, the host clients clone different portions of the same primary backup copy.

Figure 19A:
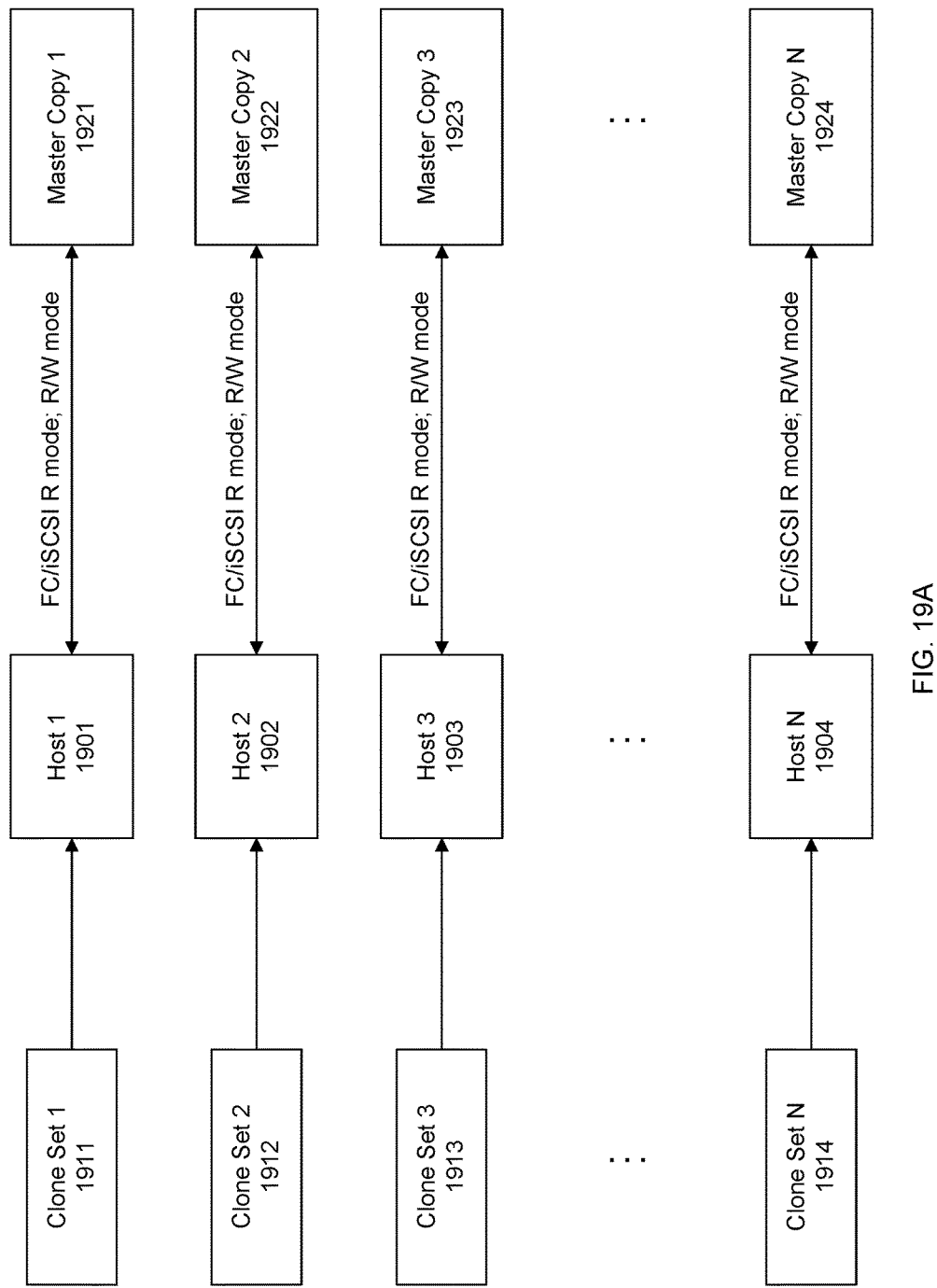
FIG. 19A shows a block diagram illustrating a distributed system according to some embodiments.

For example, as shown in FIG. 19A, multiple copies of native disk images 1921-1924 can be created from the same sparse disk file using the techniques described above. Multiple native disk files 1921-1924 can be concurrently accessed by multiple hosts 1901-1904 via respective block-based access interfaces in a read-only mode or read and write mode and in a distributed manner. Each of the hosts 1901-1904 may clone their respective block assignments of the primary backup copy represented by the original sparse disk file. The individual or resulting clone sets 1911-1914 can then be combined to generate a final clone 1950 as shown in FIG. 19B.

Referring back now to FIG. 1, the computer network system may be part of a data protection platform which provides for the backing up and restoring of data and can be used as part of a disaster recovery or restoration solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

It should be appreciated that the network may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

In an embodiment, system 100 may represent a Data Domain Restorer (DDR)-based deduplication storage system, and a storage appliance server having the backup media may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

More particularly, as illustrated in more detail in FIG. 11, in response to a data file to be stored in one or more storage units, according to one embodiment, deduplication storage engine 1107 is configured to segment the data file into multiple chunks (also referred to as segments) according to a variety of segmentation policies or rules. Deduplication storage engine 1107 may choose not to store a chunk in a storage unit if the chunk has been previously stored in the storage unit. In the event that deduplication storage engine 1107 chooses not to store the chunk in the storage unit, it stores metadata enabling the reconstruction of the file using the previously stored chunk. As a result, chunks of data files are stored in a deduplicated manner, either within each of storage units 1108 or across at least some of storage units 1108. The metadata may be stored in at least some of storage units 1108, such that files can be accessed independent of another storage unit. Metadata of each storage unit includes enough information to provide access to the files it contains.

In one embodiment, any of the backup clients may further include a backup/restore client having an optional deduplication engine having at least a portion of functionalities of deduplication engine 1107. The deduplication engines are configured to perform local deduplication operations, respectively. For example, prior to transmitting data to storage system 1104, each of the deduplication engines may deduplicate the data into deduplicated segments and determine whether a particular deduplicated segment has been stored in storage system 1104. A deduplicated segment is transmitted to storage system 1104 only if it has not been stored in storage system 1104.

For example, when client 104 is about to transmit a data stream (e.g., a file or a directory of one or more files) to storage system 1104, the deduplication engine is configured to deduplicate the data stream into deduplicated segments. For each of the deduplicated segments, client 104 transmits a fingerprint (e.g., hash) of the deduplicated segment to storage system 1104 to determine whether that particular deduplicated segment has already been stored in storage system 1104. A deduplicated segment that has been stored in storage system 1104 may have been previously received from the same client or from another client. In response to a response from storage system 1104 indicating that the segment has not been stored in storage system 1104, that particular segment is then transmitted over to the storage system 1104. As a result, the network traffic and the processing resources required can be greatly reduced.

Storage system 1104 may include any type of server or cluster of servers. For example, storage system 1104 may be a storage server used for any of various different purposes, such as to provide multiple users with access to shared data, to backup data (e.g., mission critical data), or both. In one embodiment, storage system 1104 includes, but is not limited to, backup engine 1106, deduplication storage engine 1107, and one or more storage units 1108 communicatively coupled to each other. Storage units 1108 may be implemented locally (e.g., single node operating environment) or remotely (e.g., multi-node operating environment) via interconnect 1120, which may be a bus and/or a network (e.g., a storage network or a network similar to network 110).

Storage units 1108 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Although one storage system is shown, however, storage system 1104 may represent multiple storage systems, which may be managed by management server 106. In one embodiment, management server 106 is to manage operations of the storage systems, as well as the clients or backup clients. For example, management server 106 may be an EMC Networker™ server. An administrator can log into management server from a client device such as a management console via an administrative interface (e.g., Web interface or command line interface or CLI). An administrator can utilize a backup manager or backup engine to configure and initiate a backup or replication from any of clients to any of storage systems 1104. From management server 106, an administrator can also provision or allocate any one or more of storage systems 1104 to provide storage services to the clients. For example, storage systems 1104 may be members of storage servers in a cloud, which may be public cloud, private cloud, or a hybrid cloud. Storage servers 1104 may be configured to provide storage as a service or software defined storage services, for example, as part of a software defined data center.

In a specific embodiment, a method includes receiving a request to clone a primary backup copy, identifying a disk image file comprising the primary backup copy, scanning the disk image file to split an amount of data to be cloned among a plurality of hosts, provisioning the plurality of hosts, and assigning the hosts a portion of the amount of data to be cloned, wherein a host clones its respective portion in parallel with another host to create a plurality of clone sets on a clone target, and wherein a clone set comprises a copy of at most a portion of the primary backup copy. The disk image file may be stored on a first storage device located at a first geographic location, and the clone target may include a second storage device located at a second geographic location, remote from the first geographic location.

In a specific embodiment, the disk image file includes a first format, and the scanning the disk image file includes converting the disk image file from the first format to a second format, different from the first format. The first format includes data blocks that are not contiguously located, and the second format includes data blocks that are contiguously located.

Scanning the disk image file may include identifying a number of hosts in the plurality of hosts, and based on the number of hosts, splitting the amount of data to be cloned into a number of portions, wherein the number of portions is equal to the number of hosts. Scanning the disk image file may include identifying a size of the disk image file, and based on the size of the disk image file, determining a number of hosts that should be provisioned.

The method may include mounting an instance of the primary backup copy onto each host of the plurality of hosts, wherein a first host clones a first assigned portion of the amount of data to be cloned to the clone target, and while the first host clones the first assigned portion, a second host clones a second assigned portion of the amount of data to be cloned to the clone target. The plurality of clone sets on the clone target may be consolidated to synthesize a clone of the primary backup copy.

In another specific embodiment, there is a system for cloning a primary backup copy, the system including a processor-based system executed on a computer system and configured to: receive a request to clone a primary backup copy, identify a disk image file comprising the primary backup copy, scan the disk image file to split an amount of data to be cloned among a plurality of hosts, provision the plurality of hosts, and assign the hosts a portion of the amount of data to be cloned, wherein a host clones its respective portion in parallel with another host to create a plurality of clone sets on a clone target, and wherein a clone set comprises a copy of at most a portion of the primary backup copy.

In another specific embodiment, there is a computer program product, including a non-transitory computer-readable medium having a computer-readable program code embodied therein, the computer-readable program code adapted to be executed by one or more processors to implement a method including: receiving a request to clone a primary backup copy, identifying a disk image file comprising the primary backup copy, scanning the disk image file to split an amount of data to be cloned among a plurality of hosts, provisioning the plurality of hosts, and assigning the hosts a portion of the amount of data to be cloned, wherein a host clones its respective portion in parallel with another host to create a plurality of clone sets on a clone target, and wherein a clone set comprises a copy of at most a portion of the primary backup copy.

In a specific embodiment, disk-based modelling is applied to a cloning operation. Parallel mining techniques are used to cut short the overall cloning operation. The time for an overall cloning operation is reduced depending upon the number of parallel nodes that can be provisioned. In a specific embodiment, the provisioning of these nodes is handled dynamically. The system allows the user to configure/provision nodes based on the amount or size of logical blocks that need to be copied.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving a request to clone a primary backup copy;
identifying a disk image file comprising the primary backup copy;
scanning the disk image file to split an amount of data to be cloned among a plurality of hosts;
provisioning the plurality of hosts; and
assigning the plurality of hosts a portion of the amount of data to be cloned, wherein a host clones its respective portion in parallel with another host to create a plurality of clone sets on a clone target and each host is assigned a different portion of the data to clone, wherein a clone set comprises a copy of at most a portion of the primary backup copy, and wherein the scanning the disk image file comprises:
identifying a number of hosts in the plurality of hosts; and
based on the number of hosts, splitting the amount of data to be cloned into a number of portions, wherein the number of portions is equal to the number of hosts.

2. The method of claim 1 wherein the disk image file comprises a first format, and the scanning the disk image file comprises converting the disk image file from the first format to a second format, different from the first format.

3. The method of claim 1 wherein the scanning the disk image file comprises:
identifying a size of the disk image file; and
based on the size of the disk image file, determining a number of hosts that should be provisioned.

4. The method of claim 1 comprising:
mounting an instance of the primary backup copy onto each host of the plurality of hosts, wherein a first host clones a first assigned portion of the amount of data to be cloned to the clone target,
and while the first host clones the first assigned portion, a second host clones a second assigned portion of the amount of data to be cloned to the clone target.

5. The method of claim 1 wherein the plurality of clone sets on the clone target are consolidated to synthesize a clone of the primary backup copy.

6. The method of claim 1 comprising:
maintaining the primary backup copy and the clone of the primary backup copy.

7. A system for cloning a primary backup copy, the system comprising:

a processor-based system executed on a computer system and configured to:

receive a request to clone a primary backup copy;

identify a disk image file comprising the primary backup copy;

scan the disk image file to split an amount of data to be cloned among a plurality of hosts;

provision the plurality of hosts; and assign the plurality of hosts a portion of the amount of data to be cloned, wherein a host clones its respective portion in parallel with another host to create a plurality of clone sets on a clone target and each host is assigned a different portion of the data to clone, wherein a clone set comprises a copy of at most a portion of the primary backup copy, and wherein the processor-based system is configured to:

identify a number of hosts in the plurality of hosts; and based on the number of hosts, split the amount of data to be cloned into a number of portions, wherein the number of portions is equal to the number of hosts.

8. The system of claim 7 wherein the disk image file comprises a first format, and the processor-based system is configured to convert the disk image file from the first format to a second format, different from the first format.

9. The system of claim 7 wherein the processor-based system is configured to:

identify a size of the disk image file; and based on the size of the disk image file, determine a number of hosts that should be provisioned.

10. The system of claim 7 wherein the processor-based system is configured to:

mount an instance of the primary backup copy onto each host of the plurality of hosts, wherein a first host clones a first assigned portion of the amount of data to be cloned to the clone target, and while the first host clones the first assigned portion, a second host clones a second assigned portion of the amount of data to be cloned to the clone target.

11. The system of claim 7 wherein the plurality of clone sets on the clone target are consolidated to synthesize a clone of the primary backup copy.

12. A computer program product, comprising a non-transitory computer-readable medium having a computer-readable program code embodied therein, the computer-readable program code adapted to be executed by one or more processors to implement a method comprising:

receiving a request to clone a primary backup copy;

identifying a disk image file comprising the primary backup copy;

scanning the disk image file to split an amount of data to be cloned among a plurality of hosts;

provisioning the plurality of hosts; and assigning the plurality of hosts a portion of the amount of data to be cloned, wherein a host clones its respective portion in parallel with another host to create a plurality of clone sets on a clone target and each host is assigned a different portion of the data to clone, wherein a clone set comprises a copy of at most a portion of the primary backup copy, and wherein the scanning the disk image file comprises:

identifying a number of hosts in the plurality of hosts; and based on the number of hosts, splitting the amount of data to be cloned into a number of portions, wherein the number of portions is equal to the number of hosts.

13. The computer program product of claim 12 wherein the disk image file comprises a first format, and the scanning the disk image file comprises converting the disk image file from the first format to a second format, different from the first format.

14. The computer program product of claim 12 wherein the scanning the disk image file comprises:

identifying a size of the disk image file; and based on the size of the disk image file, determining a number of hosts that should be provisioned.

15. The computer program product of claim 12 wherein the method comprises:

mounting an instance of the primary backup copy onto each host of the plurality of hosts, wherein a first host clones a first assigned portion of the amount of data to be cloned to the clone target, and while the first host clones the first assigned portion, a second host clones a second assigned portion of the amount of data to be cloned to the clone target.

16. The computer program product of claim 12 wherein the plurality of clone sets on the clone target are consolidated to synthesize a clone of the primary backup copy.

\* \* \* \* \*